(12) United States Patent
Ryu et al.

(10) Patent No.: US 11,671,940 B2
(45) Date of Patent: Jun. 6, 2023

(54) SIDELINK COMMUNICATION DURING A DOWNLINK SLOT

(71) Applicant: QUALCOMM Incorporated, San Diego, CA (US)

(72) Inventors: Jung Ho Ryu, Fort Lee, NJ (US); Junyi Li, Franklin Park, NJ (US); Tianyang Bai, Somerville, NJ (US); Kiran Venugopal, Raritan, NJ (US); Ling Ding, Chester, NJ (US); Qian Zhang, Basking Ridge, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/194,015

(22) Filed: Mar. 5, 2021

(65) Prior Publication Data

US 2021/0289476 A1    Sep. 16, 2021

Related U.S. Application Data

(60) Provisional application No. 62/987,839, filed on Mar. 10, 2020.

(51) Int. Cl.
*H04W 72/02* (2009.01)
*H04W 76/14* (2018.01)
(Continued)

(52) U.S. Cl.
CPC .......... *H04W 72/02* (2013.01); *H04B 7/0695* (2013.01); *H04W 16/28* (2013.01);
(Continued)

(58) Field of Classification Search
CPC ..... H04W 72/02; H04W 16/28; H04W 24/10; H04W 72/0446; H04W 72/046;
(Continued)

(56) References Cited

U.S. PATENT DOCUMENTS

2019/0372647 A1   12/2019   Su et al.

FOREIGN PATENT DOCUMENTS

| EP | 3582578 A1 * | 12/2019 | ........... H04B 7/0452 |
| EP | 3771248 A1 * | 1/2021 | ........... H04B 7/0695 |

(Continued)

OTHER PUBLICATIONS

International Search Report and Written Opinion—PCT/US2021/021392—ISA/EPO—dated Jun. 21, 2021.
(Continued)

*Primary Examiner* — Thai Nguyen
(74) *Attorney, Agent, or Firm* — Holland & Hart LLP

(57) ABSTRACT

Methods, systems, and devices for wireless communications are described. The described techniques provide for a first user equipment (UE) establishing a sidelink connection with a second UE. The first UE may identify a frame structure for the first UE to communicate with a base station. The frame structure may include one or more downlink slots and one or more uplink slots. The base station may indicate a set of resources for the sidelink connection with the second UE. The set of resources may include at least one downlink slot of the one or more downlink slots. In accordance with the indication, the first UE may communicate with the second UE on the sidelink connection and using at least one beam and the indicated set of resources. The communication with the second UE may utilize at least the resources in the at least one downlink slot.

30 Claims, 13 Drawing Sheets

(51) Int. Cl.
  *H04W 72/044* (2023.01)
  *H04W 16/28* (2009.01)
  *H04B 7/06* (2006.01)
  *H04W 24/10* (2009.01)
  *H04W 72/0446* (2023.01)

(52) U.S. Cl.
  CPC ......... *H04W 24/10* (2013.01); *H04W 72/046* (2013.01); *H04W 72/0446* (2013.01); *H04W 76/14* (2018.02)

(58) Field of Classification Search
  CPC ... H04W 76/14; H04W 72/08; H04W 72/042; H04W 76/15; H04W 4/40; H04B 7/0695; H04B 7/0404; H04B 7/0617; H04B 7/08
  See application file for complete search history.

(56) References Cited

FOREIGN PATENT DOCUMENTS

EP 3537755 B1 * 9/2021 ............ H04L 45/28
WO WO-2020032203 A1 2/2020

OTHER PUBLICATIONS

VIVO: "Enhancements of Uu Link to Control Sidelink", 3GPP Draft, 3GPP TSG RAN WG1 #96, R1-1901688, Enhancements of Uu Link to Control Sidelink, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599384, 8 pages, Retrieved from the Internet: URL: http://www.3gpp.org/ftp/tsg%5Fran/WG1%5FRL1/TSGR1%5F96/Docs/R1%2D1901688%2Ezip. [retrieved on Feb. 15, 2019] section 2.1, Section 2, figures 1, 2, 5.

* cited by examiner

SIDELINK COMMUNICATION DURING A DOWNLINK SLOT

CROSS REFERENCE

The present Application for Patent claims the benefit of U.S. Provisional Patent Application No. 62/987,839 by RYU et al., entitled "SIDELINK COMMUNICATION DURING A DOWNLINK SLOT," filed Mar. 10, 2020, assigned to the assignee hereof, and expressly incorporated by reference herein.

FIELD OF TECHNOLOGY

The following relates generally to wireless communications and more specifically to sidelink communication during a downlink slot.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications such that UEs may communicate with other UEs via resources allocated for sidelink communication by a base station. Further, some communications systems may support beamforming to improve communication reliability and efficiency using directional signal transmission. In some examples, UEs may be limited to particular resources for sidelink communications.

SUMMARY

The described techniques relate to improved methods, systems, devices, and apparatuses that support sidelink communication during a downlink slot. Generally, the described techniques provide for a first user equipment (UE) establishing a sidelink connection with a second UE. The sidelink connection may use a set of beams for beamformed communications. The first UE may identify a frame structure for the first UE to communicate with a base station. In some examples, the frame structure may be identified based on a downlink grant or other scheduling indication received from the base station. The frame structure may include one or more downlink slots and one or more uplink slots. The base station may indicate (e.g., via a grant) a set of resources for the sidelink connection with the second UE. The set of resources may include at least one downlink slot of the one or more downlink slots. In accordance with the indication, the first UE may communicate with the second UE on the sidelink connection and using at least one beam and the indicated set of resources. The communication with the second UE may utilize at least the resources in the at least one downlink slot.

A method of wireless communication at first UE is described. The method may include establishing a sidelink connection with a second UE, the sidelink connection using a set of beams, identifying a frame structure for the first UE to use to communicate with a base station, the frame structure including one or more downlink slots and one or more uplink slots, receiving, from the base station, an indication of a set of resources for the sidelink connection with the second UE, the set of resources including resources in at least one downlink slot of the one or more downlink slots, and communicating with the second UE on the sidelink connection using at least one beam of the set of beams and the indicated set of resources, including the resources in the at least one downlink slot.

An apparatus for wireless communication at first UE is described. The apparatus may include a processor, memory coupled with the processor, and instructions stored in the memory. The instructions may be executable by the processor to cause the apparatus to establish a sidelink connection with a second UE, the sidelink connection using a set of beams, identify a frame structure for the first UE to use to communicate with a base station, the frame structure including one or more downlink slots and one or more uplink slots, receive, from the base station, an indication of a set of resources for the sidelink connection with the second UE, the set of resources including resources in at least one downlink slot of the one or more downlink slots, and communicate with the second UE on the sidelink connection using at least one beam of the set of beams and the indicated set of resources, including the resources in the at least one downlink slot.

Another apparatus for wireless communication at first UE is described. The apparatus may include means for establishing a sidelink connection with a second UE, the sidelink connection using a set of beams, identifying a frame structure for the first UE to use to communicate with a base station, the frame structure including one or more downlink slots and one or more uplink slots, receiving, from the base station, an indication of a set of resources for the sidelink connection with the second UE, the set of resources including resources in at least one downlink slot of the one or more downlink slots, and communicating with the second UE on the sidelink connection using at least one beam of the set of beams and the indicated set of resources, including the resources in the at least one downlink slot.

A non-transitory computer-readable medium storing code for wireless communication at first UE is described. The code may include instructions executable by a processor to establish a sidelink connection with a second UE, the sidelink connection using a set of beams, identify a frame structure for the first UE to use to communicate with a base station, the frame structure including one or more downlink slots and one or more uplink slots, receive, from the base station, an indication of a set of resources for the sidelink connection with the second UE, the set of resources including resources in at least one downlink slot of the one or more downlink slots, and communicate with the second UE on the sidelink connection using at least one beam of the set of beams and the indicated set of resources, including the resources in the at least one downlink slot.

Some examples of the method, apparatuses, and non-transitory computer-readable medium described herein may further include operations, features, means, or instructions for performing a beam measurement procedure on a set of beams to identify the set of beams, and transmitting, to the base station, a report indicating a result of the beam measurement procedure, the indication of the set of resources based on the transmitted report.

In some examples of the method, apparatuses, and non-transitory computer-readable medium described herein, performing the beam measurement procedure may include operations, features, means, or instructions for measuring, using each receive beam of a set of receive beams of the set of beams, one or more first reference signals received using the receive beam, and transmitting one or more second reference signals using a set of transmit beams.

In some examples of the method, apparatuses, and non-transitory computer-readable medium described herein, the one or more first reference signals may be transmitted using resources in the one or more downlink slots, or the one or more second reference signals may be received using resources in the one or more downlink slots, or both.

In some examples of the method, apparatuses, and non-transitory computer-readable medium described herein, communicating with the second UE may include operations, features, means, or instructions for transmitting, to the second UE and using at least one transmit beam of the sidelink connection, a signal on resources of the indicated set of resources for the sidelink connection in the at least one downlink slot.

Some examples of the method, apparatuses, and non-transitory computer-readable medium described herein may further include operations, features, means, or instructions for receiving, from the second UE, feedback in response to the transmitted signal, and transmitting the received feedback to the base station.

In some examples of the method, apparatuses, and non-transitory computer-readable medium described herein, communicating with the second UE may include operations, features, means, or instructions for receiving, from the second UE and using at least one receive beam of the sidelink connection, a signal on resources of the indicated set of resource for the sidelink connection in the at least one downlink slot.

Some examples of the method, apparatuses, and non-transitory computer-readable medium described herein may further include operations, features, means, or instructions for generating feedback in response to the received signal, and transmitting the feedback to the second UE, or the base station, or both.

Some examples of the method, apparatuses, and non-transitory computer-readable medium described herein may further include operations, features, means, or instructions for receiving, from the base station, an identification of the set of beams for the sidelink connection.

In some examples of the method, apparatuses, and non-transitory computer-readable medium described herein, the base station, the first UE, and the second UE operate in accordance with a mode 1 sidelink operation mode.

In some examples of the method, apparatuses, and non-transitory computer-readable medium described herein, the indication of the set of resources further indicates whether the first UE may be to transmit a signal to the second UE or receive a signal from the second UE using resources in the at least one downlink slot.

A method for wireless communication at a base station is described. The method may include identifying a frame structure for the base station to use to communicate with a first UE, the frame structure including one or more downlink slots and one or more uplink slots, transmitting, to the first UE, an indication of a set of resources for a sidelink connection between the first UE and a second UE, the set of resources including resources in at least one downlink slot of the one or more downlink slots, and the sidelink connection using a set of beams at the first UE, and receiving feedback associated with communications between the first UE and the second UE over the sidelink connection during the at least one downlink slot.

An apparatus for wireless communication at a base station is described. The apparatus may include a processor, memory coupled with the processor, and instructions stored in the memory. The instructions may be executable by the processor to cause the apparatus to identify a frame structure for the base station to use to communicate with a first UE, the frame structure including one or more downlink slots and one or more uplink slots, transmit, to the first UE, an indication of a set of resources for a sidelink connection between the first UE and a second UE, the set of resources including resources in at least one downlink slot of the one or more downlink slots, and the sidelink connection using a set of beams at the first UE, and receive feedback associated with communications between the first UE and the second UE over the sidelink connection during the at least one downlink slot.

Another apparatus for wireless communication at a base station is described. The apparatus may include means for identifying a frame structure for the base station to use to communicate with a first UE, the frame structure including one or more downlink slots and one or more uplink slots, transmitting, to the first UE, an indication of a set of resources for a sidelink connection between the first UE and a second UE, the set of resources including resources in at least one downlink slot of the one or more downlink slots, and the sidelink connection using a set of beams at the first UE, and receiving feedback associated with communications between the first UE and the second UE over the sidelink connection during the at least one downlink slot.

A non-transitory computer-readable medium storing code for wireless communication at a base station is described. The code may include instructions executable by a processor to identify a frame structure for the base station to use to communicate with a first UE, the frame structure including one or more downlink slots and one or more uplink slots, transmit, to the first UE, an indication of a set of resources for a sidelink connection between the first UE and a second UE, the set of resources including resources in at least one downlink slot of the one or more downlink slots, and the sidelink connection using a set of beams at the first UE, and receive feedback associated with communications between the first UE and the second UE over the sidelink connection during the at least one downlink slot.

Some examples of the method, apparatuses, and non-transitory computer-readable medium described herein may further include operations, features, means, or instructions for receiving, from at least one of the first UE and the second UE, a report indicating a result of a beam measurement procedure performed by the at least one of the first UE and the second UE, and identifying the set of resources for the sidelink connection, the set of beams, or both based on the report.

Some examples of the method, apparatuses, and non-transitory computer-readable medium described herein may further include operations, features, means, or instructions for transmitting, to at least one of the first UE and the second UE, an instruction to perform the beam measurement procedure.

In some examples of the method, apparatuses, and non-transitory computer-readable medium described herein, the beam measurement procedure may be performed using resources in the one or more downlink slots.

Some examples of the method, apparatuses, and non-transitory computer-readable medium described herein may further include operations, features, means, or instructions for receiving, from the first UE, the second UE, a third UE, or a combination thereof, signal quality measurements corresponding to the set of beams, and identifying at least one beam pair of the set of beams based on the received signal quality measurements.

Some examples of the method, apparatuses, and non-transitory computer-readable medium described herein may further include operations, features, means, or instructions for transmitting, to the first UE, or the second UE, or both, an indication of the at least one beam pair to use for the communications over the sidelink connection during the at least one downlink slot.

Some examples of the method, apparatuses, and non-transitory computer-readable medium described herein may further include operations, features, means, or instructions for determining that a signal quality measurement for the at least one beam pair may be above a signal quality threshold, where the at least one beam pair may be identified based on the signal quality threshold.

Some examples of the method, apparatuses, and non-transitory computer-readable medium described herein may further include operations, features, means, or instructions for transmitting, to the third UE, a downlink signal using resources in the one or more downlink slots, and receiving, from the third UE, a signal quality measurement associated with the downlink signal, where the at least one beam pair may be identified based on the signal quality measurement associated with the downlink signal.

Some examples of the method, apparatuses, and non-transitory computer-readable medium described herein may further include operations, features, means, or instructions for identifying the set of resources for the sidelink connection, the set of beams, or both based on the feedback.

Some examples of the method, apparatuses, and non-transitory computer-readable medium described herein may further include operations, features, means, or instructions for transmitting, to a third UE, a downlink signal using resources in the at least one downlink slot.

In some examples of the method, apparatuses, and non-transitory computer-readable medium described herein, transmitting the downlink signal may include operations, features, means, or instructions for transmitting, to the third UE, the downlink signal using a transmit beam, the third UE configured to receive the downlink signal using a receive beam.

In some examples of the method, apparatuses, and non-transitory computer-readable medium described herein, the base station, the first UE, and the second UE operate in accordance with a mode 1 sidelink operation mode.

In some examples of the method, apparatuses, and non-transitory computer-readable medium described herein, the indication of the set of resources further indicates whether the first UE may be to transmit a signal to the second UE or receive a signal from the second UE using resources in the at least one downlink slot, where the communications may be performed based on the indication.

DETAILED DESCRIPTION

Figure 1:
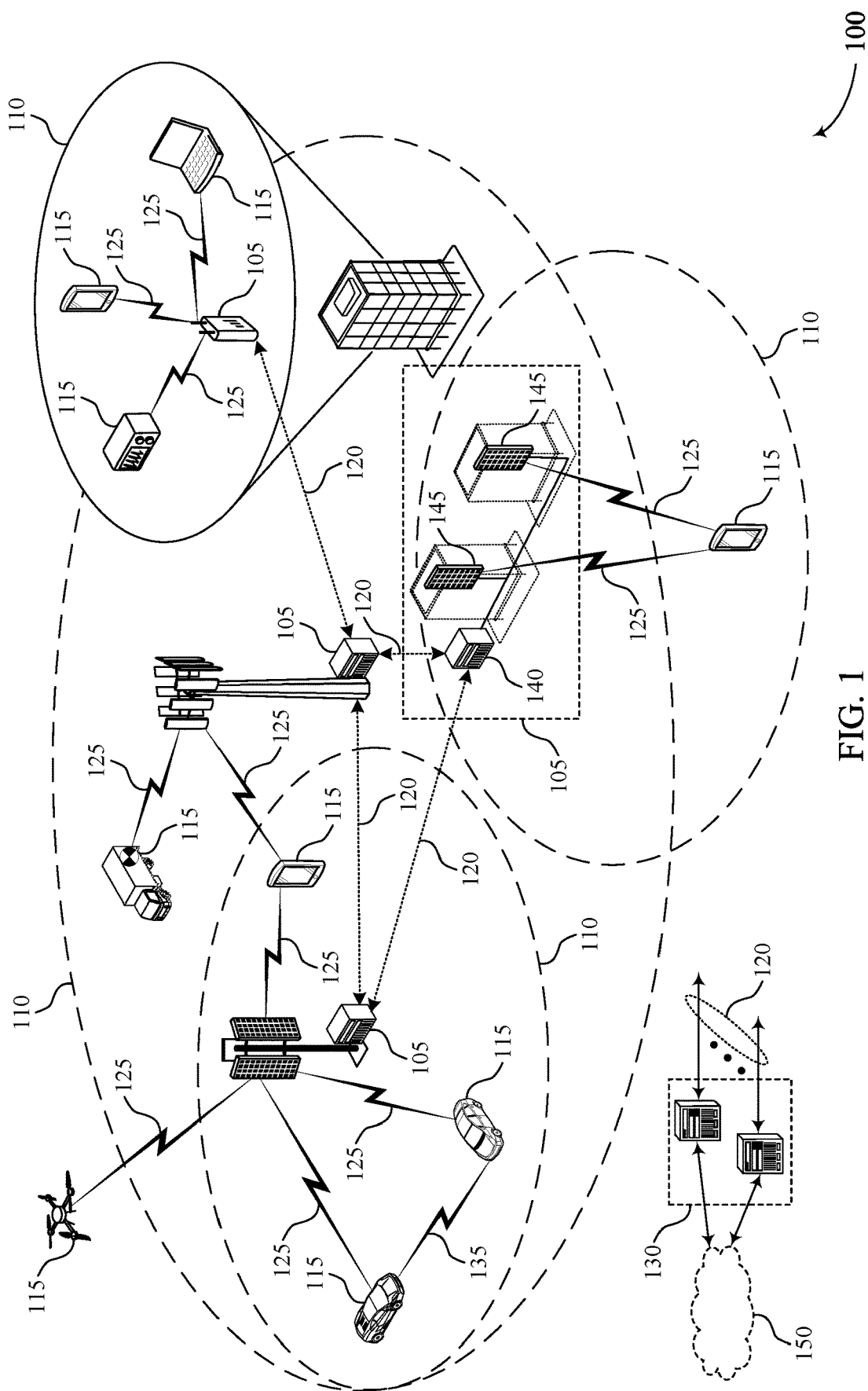
FIG. 1 illustrates an example of a system for wireless communications that supports sidelink communication during a downlink slot in accordance with aspects of the present disclosure.

Some wireless communications systems may support sidelink communications such that user equipments (UEs) may communicate with other UEs via resources allocated for sidelink communication by a base station. In some cases, UEs may be limited to particular resources for sidelink communications. For example, in accordance with some sidelink operation modes, such as a mode 1 sidelink operation mode, UEs may be limited to sidelink transmissions using resources of uplink slots. This constraint may be implemented to avoid interfering with downlink transmissions. That is, sidelink transmissions by UEs during downlink slots may interfere with downlink communications by a base station to other UEs within a coverage area and during the downlink slots. The UEs may not interfere with uplink communications during uplink slots because UEs may transmit with a lower power for sidelink communications.

Beamforming may be used by UEs and base stations to increase communication reliability and throughput by constraining transmissions in one or more directions. These beamforming techniques may be used in sidelink communications to improve the communication reliability and throughput. According to the implementations described herein, UE to UE sidelink communications may be improved by using beamforming to avoid interference with downlink communications by a base station during downlink slots. That is, the UE may transmit a sidelink communication during one or more downlink slots and avoid interfering with other UEs receiving downlink communications by a base station by using beamforming in the sidelink connection.

A pair of UEs may establish a sidelink communication connection that uses a set of beams. One or both of the UEs may identify a frame structure for communicating with a base station. The frame structure may include one or more uplink and downlink slots that may determine whether the UEs are to transmit (uplink) or receive (downlink) when communicating with the base station. The UEs may receive, from the base station, an indication of a set of resources to use for the sidelink connection with the other UE. The set of resources may include at least one downlink slot of the one or more downlink slots of the identified frame structure. The UEs may communicate on the sidelink connection using at least one beam and the indicated set of resources that include the resources in the at least one downlink slot. Accordingly, the UEs may communicate via sidelink using resources of at least one downlink slot by using beamforming.

In some examples, a base station may indicate one or more beams or beam pairs to use for the sidelink connection. The base station may identify the beams for the sidelink connection based on a beam measurement procedure performed by the UEs on a plurality of beams. That is, each UE of the sidelink pair may measure beamformed signals received from the other UE to identify beams for the sidelink connection. The UEs may transmit one or more reports indicating results of the beam measurement procedure to the base station, and the base station may identify the beams based on the reports. In some examples, the base station may receive feedback (e.g., hybrid automatic repeat request (HARQ) feedback) associated with the sidelink communications and may identify beams based on the received feedback. Accordingly, the base station may utilize beam measurements, feedback, as well as signal quality reports to identify resources and/or beams for the sidelink communications, and more particularly, the sidelink communications using resources of at least one downlink slot.

Particular aspects of the subject matter described herein may be implemented to realize one or more advantages. The described techniques may support improvements in the sidelink communication framework, decreasing signaling overhead, and improving reliability, among other advantages. As such, supported techniques may include improved network operations and, in some examples, may promote network efficiencies, among other benefits. Aspects of the disclosure are initially described in the context of wireless communications systems. Aspects of the disclosure are further described with respect to a wireless communications system and process flow diagrams. Aspects of the disclosure are further illustrated by and described with reference to apparatus diagrams, system diagrams, and flowcharts that relate to sidelink communication during a downlink slot.

FIG. 1 illustrates an example of a wireless communications system 100 that supports sidelink communication during a downlink slot in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A pair of UEs 115 may establish a sidelink communication link 135 that uses a set of beams. The set of beams may include one or more beam pairs that include a transmit beam by a first UE 115 and a receive beam by a second UE 115 and/or a receive beam by the first UE 115 and a transmit beam by the second UE 115. One or both of the UEs 115 may identify a frame structure for communicating with a base station 105. The frame structure may include one or more uplink and downlink slots. The UEs 115 may receive, from the base station 105, an indication of a set of resources to use for the sidelink connection with the other UE 115. The set of resources may include at least one downlink slot of the one or more downlink slots. The UEs 115 may communicate on the sidelink connection using at least one beam and the indicated set of resources that include the resources in the at least one downlink slot. Accordingly, the UEs 115 may communicate on a sidelink connection using resources of at least one downlink slot by using beamforming.

According to these techniques, the UEs 115 may be provided with more sidelink communication opportunities since the UEs 115 may not be limited to sidelink communications in an uplink slot. That is, the UEs 115 may be able to communicate over sidelink connections using both downlink and uplink slots of the frame structure identified for communicating with the base station 105. Because the UEs 115 may utilize beamforming in the sidelink connection, the sidelink communications may not interfere with downlink communications between a base station 105 and other UEs 115. In some examples, a base station may identify and indicate resources to the UE 115 for utilization in the sidelink connection in order to minimize interference between sidelink and downlink communications.

Figure 2:
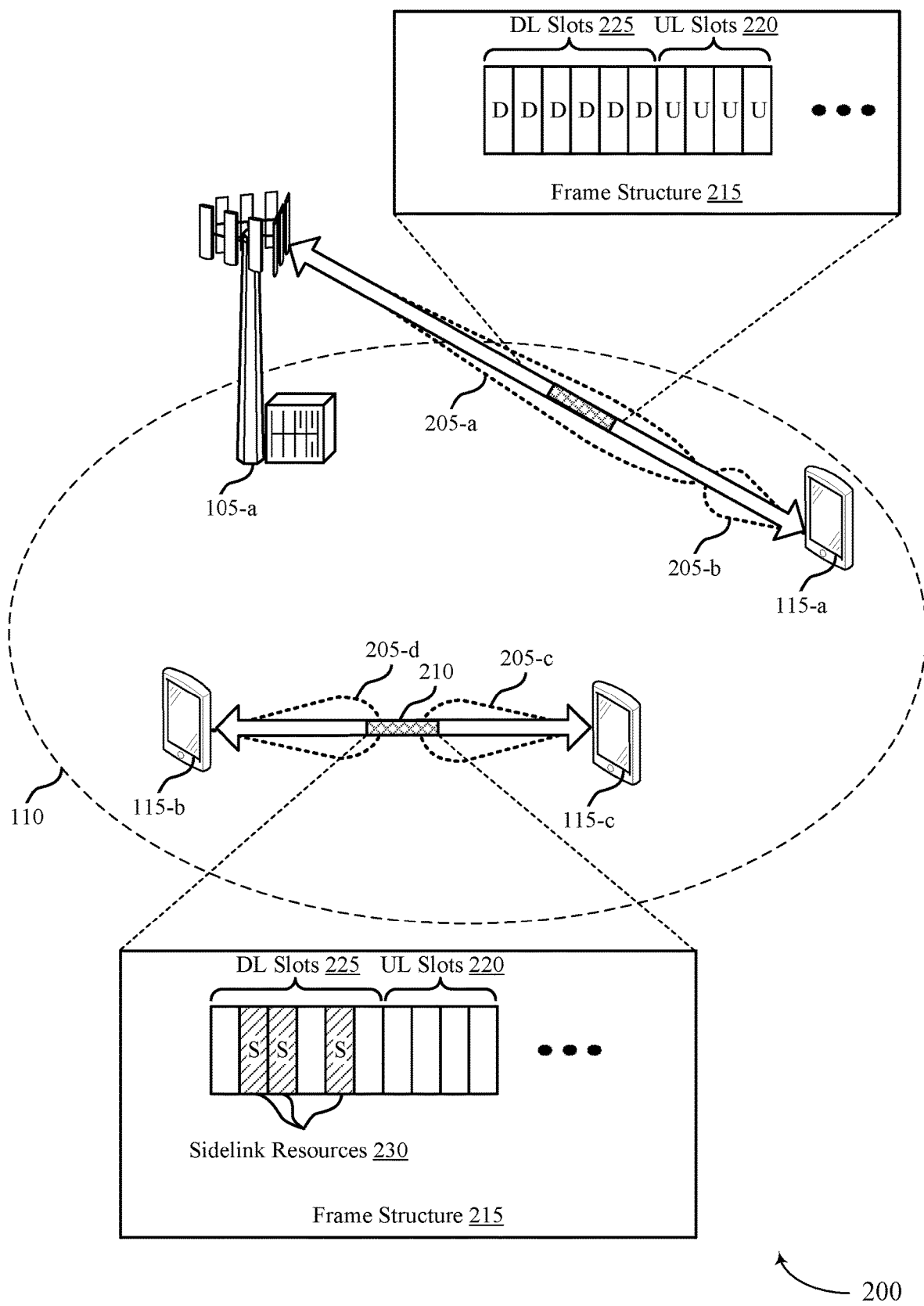
FIG. 2 illustrates an example of a wireless communications system that supports sidelink communication during a downlink slot in accordance with aspects of the present disclosure.

FIG. 2 illustrates an example of a wireless communications system 200 that supports sidelink communication during a downlink slot in accordance with aspects of the present disclosure. In some examples, wireless communications system 200 may implement aspects of wireless communications system 100. The wireless communications system includes a base station 105-a and UEs 115, including UE 115-a UE 115-b, and UE 115-c. The base station 105-a and the UEs 115 may be examples of the corresponding devices of FIG. 1.

The base station 105-a may be configured to transmit signals to UEs 115 within a coverage area 110 using resources (e.g., slots) of a frame structure 215 allocated for downlink communication, and the UEs 115 may be configured to transmit signals to the base station 105-a using resources (e.g., slots) of the frame structure 215 allocated for uplink communication. Further, the base station 105-a and the UEs 115-a may support beamforming, in which beams 205 may be used to transmit and/or receive signals in one or more directions to improve reliability and throughput of the wireless communications system 200.

Wireless communications system 200 further supports sidelink communications between UEs 115. As illustrated, UE 115-b and UE 115-c may be configured to communicate over a sidelink connection 210. In some examples, the sidelink communications may be performed in accordance with a mode 1 sidelink communication mode, in which a base station 105-a may manage the sidelink communications. More particularly, the base station 105-a may identify and schedule resources 230 and beams for UEs 115 to use for sidelink communications. In some cases, the sidelink communication resources 230 may be limited to uplink slots such that communications between UEs 115 do not interfere with downlink communications to other UEs 115. For example, UE 115-b may transmit signals to the UE 115-c during one or more uplink slots such that the signals do not interfere with signals transmitted to the UE 115-a by the base station 105-a during a downlink slot. Transmission of sidelink communication during an uplink slot may reduce, avoid, or otherwise not cause interference to uplink transmission (e.g., by UE 115-a) because sidelink transmission may be transmitted with lower power. That is, a sidelink communication by UE 115-b during an uplink slot has a low probability of reaching the base station 105-a and interfering with another transmission that uses resources of an uplink slot.

In accordance with aspects of the disclosure herein, UEs 115 may communicate over a sidelink connection 210 using resources 230 of one or more downlink slots (in addition to uplink slots in some examples). The UEs 115 may use beamforming on the sidelink connection to avoid interference with transmission by the base station 105-a (as well as other UEs 115) using resources of a slot scheduled for downlink communications (e.g., a DL slot 225). That is, by using beamforming the UEs 115 may direct the sidelink communications (using one or more beams) such that the sidelink communications reduce or avoid interference with other communications. For example, UE 115-b may transmit a communication to UE 115-c using beam 205-c. By using beam 205-c, the communication may reduce or avoid interference with the communications between UE 115-a and base station 105-a.

The UEs 115 may identify the frame structure 215 for the UEs 115 to communicate with the base station 105-a. The frame structure may be identified based on a semi-static or aperiodic grant or a slot format indication received by one or more of UEs 115-a, 115-b, or 115-c from the base station 105-a. In some cases, the grant is indicated via downlink control information (DCI) or RRC signaling. The frame structure 215 may include one or more uplink slots 220 and one or more downlink slots 225. One or both of the UEs 115-b and 115-c may receive an indication from the base station and the indication may identify the set of resources 230 for the sidelink connection. The set of resources 230 may include resources in at least one downlink slot 225 of the one or more downlink slots 225. In accordance with the indication, the UEs 115 may communicate over the sidelink connection 210 using the indicated resources 230 (e.g., including resources of the at least one downlink slot 225). In some examples, the base station 105-a may transmit downlink transmissions using resources of the downlink slots 225 of the frame structure 215 in which the sidelink resources 230 are occurring. That is, the base station 105-a may perform downlink communications with the UE 115-*a* during the same period of the frame structure 215 that UE 115-*b* and the UE 115-*c* are communicating during the downlink slots 225 of the sidelink resources 230. The downlink communications with the UE 115-*a* may utilize beamforming. For example, the base station 105-*a* may use a transmit beam to transmit the downlink signal, and the UE 115-*a* may use a receive beam to receive the downlink signal. In some examples, the base station may configure the receive beam for the UE 115-*a* to receive the downlink signal.

In some examples, the base station 105-*a* may also transmit (e.g., as part of the sidelink resource indication) an indication of the direction of the sidelink communications between the UE 115-*b* and the UE 115-*c* during the resources 230. For example, the base station 105-*a* may indicate that the UE 115-*c* is to transmit to the UE 115-*b* during a downlink slot 225 of the sidelink resources 230 such as to minimize, avoid, or reduce, potential interface with a downlink communication by the base station 105-*a* to the UE 115-*a* during the same downlink slot. Accordingly, the UE 115-*c* may transmit the sidelink communication in an opposite direction or in a direction away from the UE 115-*a* for interference reduction.

In some examples, the UEs 115 of a sidelink connection may perform a beam measurement procedure to identify the beams (and other resources) for the sidelink connection. One or more of the UEs 115 may transmit a beam measurement report to the base station 105-*a*, and the base station 105-*a* may identify the beams to use for the sidelink connection based on the reports. Accordingly, the base station 105-*a* may transmit an indication of the set of beams (e.g., one or more beam pairs) to use for the sidelink connection. A beam pair may correspond to a transmit beam at one of the UEs 115 and a receive beam at the other of the UEs 115. Thus, a set of beams corresponding to the sidelink connection between the UE 115-*b* and the UE 115-*c* may include multiple beam pairs of a first direction from the UE 115-*b* to the UE 115-*c* or a second direction from the UE 115-*c* to the UE 115-*b*. The beam measurement procedure may include measuring, using each receive beam of a set of receive beams of the sidelink connection, a set of reference signals transmitted by another UE 115. For example, the UE 115-*b* may measure reference signals received on a set of receive beams (e.g., beam 205-*c*) from the UE 115-*c*. The receive beam measurement may be performed on a first set of resources allocated for the beam measurement procedure (e.g., by the base station). On a second set of resources, the UE 115-*b* may transmit reference signals on each transmit beam of the set of beams. The UE 115-*c* may use receive beams and measure the reference signals transmitted by the UE 115-*b*.

The measurements may be transmitted by the UE 115-*b*, or UE 115-*c*, or both, to the base station 105-*a*. The base station 105-*a* may identify one or more beam pairs to use for the sidelink connection 210 by the UE 115-*b* and the UE 115-*c*. In some examples, the transmission of reference signals for the beam measurement procedure may use resources of one or more downlink slots. As such, the base station 105-*a* may communicate with a third UE 115-*a* on resources the downlink slots and use feedback from the third UE 115-*a* to identify whether particular beams or resources used by the UEs 115-*b* and UE 115-*c* interferes with the downlink communications. The feedback may include HARQ-ACK feedback and/or signal quality reports.

Additionally or alternatively, the base station 105-*a* may consider feedback associated with sidelink communications when identifying beams and/or resources 230. The base station 105-*a* may receive HARQ-ACK feedback from the UE 115-*b* and/or the UE 115-*c* corresponding to communications on the sidelink connection 210. For example, the UE 115-*b* may transmit a signal to the UE 115-*c* on the sidelink, and the UE 115-*c* may generate feedback corresponding to the signal. The feedback may be an acknowledgement (ACK) or a negative acknowledgement (NACK) and may be transmitted to the UE 115-*b* and/or the base station 105-*a*. In examples where the UE 115-*b* receives the feedback, the UE 115-*b* may relay the feedback to the base station 105-*a*.

In some examples, the base station 105-*a* may schedule sidelink communications and downlink communications when mutual interference between the communications is below a particular threshold. The base station 105-*a* may determine the mutual interference based on the results of the beam measurement procedure, the feedback associated with the sidelink communications and/or the downlink communications, or signal quality measurements. For example, the base station 105-*a* may determine whether the sidelink communications on particular beam pairs interfere with the downlink communication with the UE 115-*a* above an acceptable threshold. Further, the base station 105-*a* may determine whether the downlink communications with the UE 115-*a* interfere with the sidelink communications between the UE 115-*b* and the UE 115-*c* above a threshold. That is, the base station may consider explicit interference, or signal quality measurements, or both, between the UEs 115 and beam pairs relative to the sidelink transmission/reception beam (e.g., beam pair) and the downlink receive beam (e.g., by the UE 115-*a*). Accordingly, the base station 105-*a* may use signal quality measurements and the known beams used for various transmissions to determine which beams to use and/or which beams to not use, as well as various resources, when scheduling sidelink and downlink communications.

Additionally or alternatively, the base station 105-*a* may consider the feedback received from the UEs 115. For example, if a sidelink communication and a downlink communication were scheduled during the same time periods (e.g., slots), and negative feedback associated with either of the communications increased, then the base station 105-*a* may determine to not schedule the sidelink and downlink at the same time (or use different beams) for subsequent communications. Similarly, if the downlink and sidelink resources were scheduled at the same time and the error rate did not increase (e.g., the NACK rate did not increase), then the base station 105-*a* may subsequently schedule those transmission during the same transmission resources 230 (e.g., slots) (or using the same beams) for subsequent communications.

Figure 3:
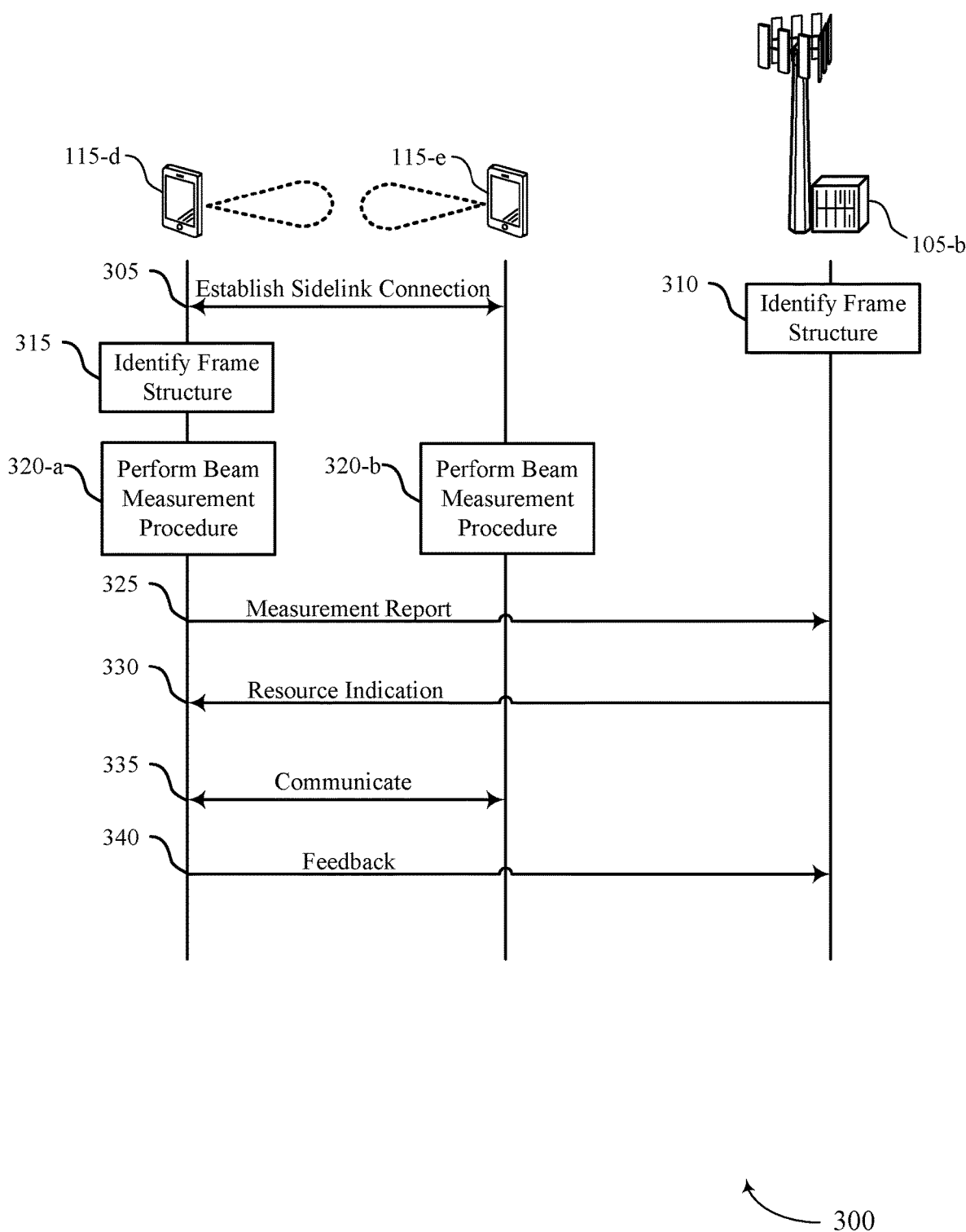
FIG. 3 illustrates an example of a process flow diagram that supports sidelink communication during a downlink slot in accordance with aspects of the present disclosure.

FIG. 3 illustrates an example of a process flow diagram 300 that supports sidelink communication during a downlink slot in accordance with aspects of the present disclosure. In some examples, the process flow diagram 300 may implement aspects of wireless communications system 100. The process flow diagram 300 includes UE 115-*d*, UE 115-*e*, and base station 105-*b*, which may be examples of the corresponding devices of FIGS. 1 and 2. The UE 115-*d* may be an example of a first UE, and the UE 115-*e* may be an example a second UE.

At 305, the first UE 115-*d* may establish a sidelink connection with the second UE 115-*e*. The sidelink connection may utilize a set of beams. The set of beams may include one or more beam pairs including a receive beam at one of the UEs 115 and a transmit beam at one of the UEs 115. At 310, the base station may identify a frame structure to use for communication with the first UE 115-*d*. The frame structure may include one or more downlink slots and one or more uplink slots.

At 315, the first UE 115-*d* may identify the frame structure. In some cases, the frame structure may be identified based on a scheduling transmission received from the base station 105-*b*. The scheduling transmission may be an example of an RRC signal, downlink control information signal, etc.

At 320-*a*, the first UE 115-*d*, and the second UE 115-*e* at 320-*b*, may perform a beam measurement procedure on a plurality of beams to identify the set of beams for the sidelink connection. To perform the beam measurement procedure, the first UE 115-*d* may measure, using each receive beam of a set of receive beams of the plurality of beams, one or more first reference signals received using the receive beam and transmitted by the second UE1 115-*e*. The first UE 115-*d* may also transmit one or more second reference signals using a set of transmit beams.

At 325, the first UE 115-*d* may transmit, to the base station 105-*b*, a report indicating a result of the beam measurement procedure. Additionally or alternatively, the second UE 115-*e* may transmit a report indicating a result of the beam measurement procedure. In some examples, the first UE 115-*d* may receive measurements performed by the second UE 115-*e* and transmit such measurements to the base station 105-*b* in the report. Additionally or alternatively, the second UE 115-*e* may receive measurements performed by the first UE 115-*d* and transmit such measurement to the base station 105-*b* in the report.

At 330, the UE 115-*d* may receive, from the base station 105-*b*, an indication of a set of resources for the sidelink connection with the second UE 115-*b*. The set of resources may include resources in at least one downlink slot of the one or more downlink slots of the frame structure. In some examples, the set of resources are based at least in part on the measurement report receive from the UE 115-*d*. Additionally or alternatively, the set of resources may be based at least in part on the measurement report received from the UE 115-*e*. In some examples, the base station 105-*b* may indicate one or more beams of the set of beams that the UE 115-*d* is to use for the sidelink connection.

At 335, the UE 115-*a* may communicate with the second UE 115-*e* on the sidelink connection using at least one beam of the set of beams and the indicated set of resources, including the resources in the at least one downlink slot.

At 340, the base station 105-*b* may receive feedback associated with communications between the first UE and the second UE over the sidelink connection during the at least one downlink slot.

Figure 4:
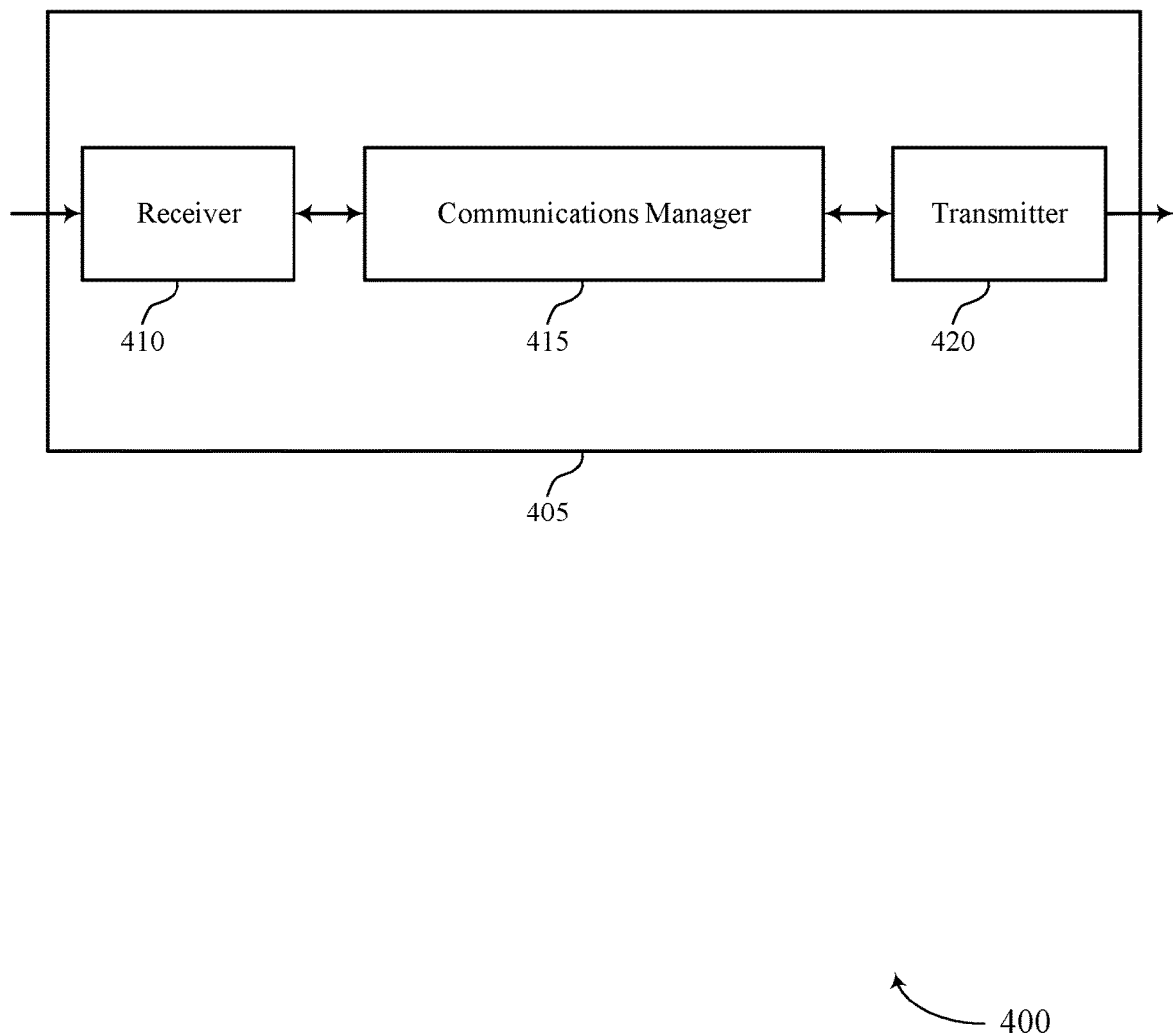
FIGS. 4 and 5 show block diagrams of devices that support sidelink communication during a downlink slot in accordance with aspects of the present disclosure.

FIG. 4 shows a block diagram 400 of a device 405 that supports sidelink communication during a downlink slot in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to sidelink communication during a downlink slot, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may establish a sidelink connection with a second UE, the sidelink connection using a set of beams, identify a frame structure for the first UE to use to communicate with a base station, the frame structure including one or more downlink slots and one or more uplink slots, receive, from the base station, an indication of a set of resources for the sidelink connection with the second UE, the set of resources including resources in at least one downlink slot of the one or more downlink slots, and communicate with the second UE on the sidelink connection using at least one beam of the set of beams and the indicated set of resources, including the resources in the at least one downlink slot. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to more efficiently communicate with other devices over sidelink connections, and more specifically to communicate over sidelink using resources of at least one downlink slot. For example, the device 405 may receive an indication of sidelink resources that include at least one downlink slot and communicate with another device using the at least one downlink slot and at least one beam.

Based on implementing the sidelink techniques as described herein, a processor of a UE 115 (e.g., controlling the receiver 410, the transmitter 420, or the transceiver 720 as described with reference to FIG. 7) may increase reliability and decrease signaling overhead in the communication of sidelink transmission because sidelink communications may be performed using resources of downlink slots in addition to uplink slots.

Figure 5:
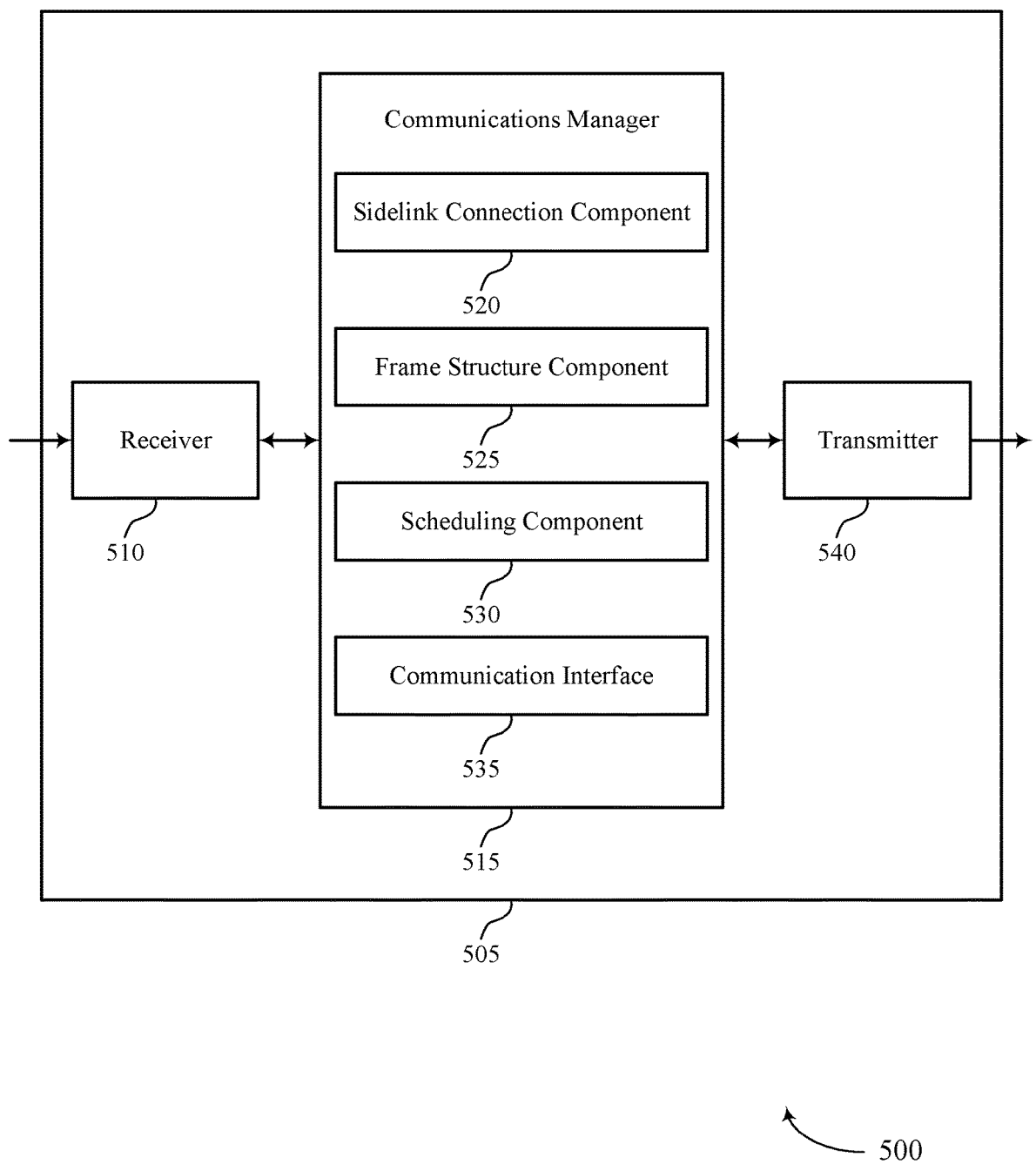

FIG. 5 shows a block diagram 500 of a device 505 that supports sidelink communication during a downlink slot in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to sidelink communication during a downlink slot, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a sidelink connection component 520, a frame structure component 525, a scheduling component 530, and a communication interface 535. The communications manager 515 may be an example of aspects of the communications manager 710 described herein.

The sidelink connection component 520 may establish a sidelink connection with a second UE, the sidelink connection using a set of beams. The frame structure component 525 may identify a frame structure for the first UE to use to communicate with a base station, the frame structure including one or more downlink slots and one or more uplink slots.

The scheduling component 530 may receive, from the base station, an indication of a set of resources for the sidelink connection with the second UE, the set of resources including resources in at least one downlink slot of the one or more downlink slots.

The communication interface 535 may communicate with the second UE on the sidelink connection using at least one beam of the set of beams and the indicated set of resources, including the resources in the at least one downlink slot.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
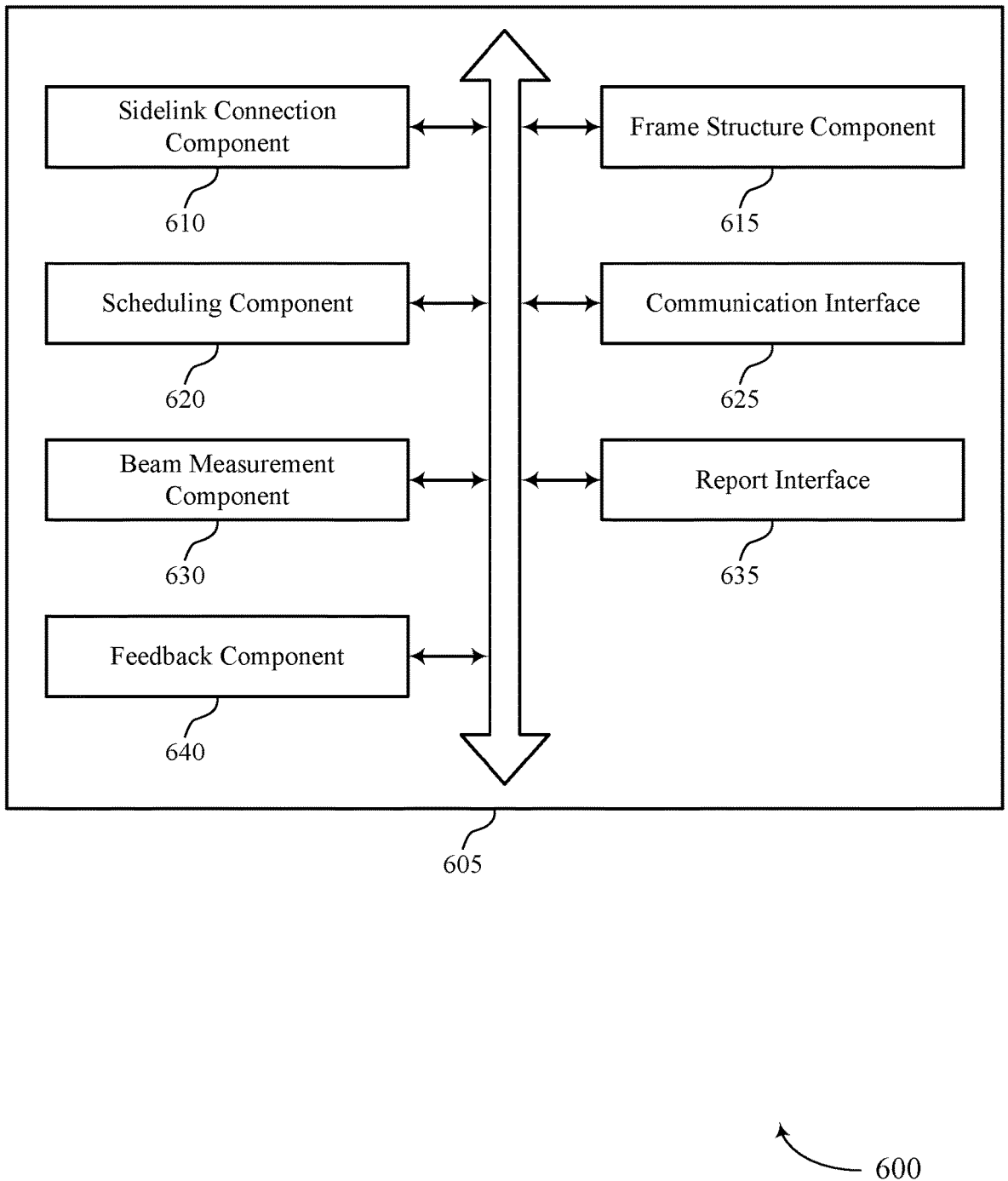
FIG. 6 shows a block diagram of a communications manager that supports sidelink communication during a downlink slot in accordance with aspects of the present disclosure.

FIG. 6 shows a block diagram 600 of a communications manager 605 that supports sidelink communication during a downlink slot in accordance with aspects of the present disclosure. The communications manager 605 may be an example of aspects of a communications manager 415, a communications manager 515, or a communications manager 710 described herein. The communications manager 605 may include a sidelink connection component 610, a frame structure component 615, a scheduling component 620, a communication interface 625, a beam measurement component 630, a report interface 635, and a feedback component 640. Each of these modules may communicate, directly or indirectly, with one another (e.g., via one or more buses).

The sidelink connection component 610 may establish a sidelink connection with a second UE, the sidelink connection using a set of beams. The frame structure component 615 may identify a frame structure for the first UE to use to communicate with a base station, the frame structure including one or more downlink slots and one or more uplink slots.

The scheduling component 620 may receive, from the base station, an indication of a set of resources for the sidelink connection with the second UE, the set of resources including resources in at least one downlink slot of the one or more downlink slots.

In some examples, the scheduling component 620 may receive, from the base station, an identification of the set of beams for the sidelink connection. In some cases, the indication of the set of resources further indicates whether the first UE is to transmit a signal to the second UE or receive a signal from the second UE using resources in the at least one downlink slot.

The communication interface 625 may communicate with the second UE on the sidelink connection using at least one beam of the set of beams and the indicated set of resources, including the resources in the at least one downlink slot.

In some examples, the communication interface 625 may transmit, to the second UE and using at least one transmit beam of the sidelink connection, a signal on resources of the indicated set of resources for the sidelink connection in the at least one downlink slot.

In some examples, the communication interface 625 may receive, from the second UE and using at least one receive beam of the sidelink connection, a signal on resources of the indicated set of resource for the sidelink connection in the at least one downlink slot.

In some cases, the base station, the first UE, and the second UE operate in accordance with a mode 1 sidelink operation mode. The beam measurement component 630 may perform a beam measurement procedure on a set of beams to identify the set of beams.

In some examples, the beam measurement component 630 may measure, using each receive beam of a set of receive beams of the set of beams, one or more first reference signals received using the receive beam.

In some examples, the beam measurement component 630 may transmit one or more second reference signals using a set of transmit beams. In some cases, the one or more first reference signals are transmitted using resources in the one or more downlink slots, or the one or more second reference signals are received using resources in the one or more downlink slots, or both.

The report interface 635 may transmit, to the base station, a report indicating a result of the beam measurement procedure, the indication of the set of resources based on the transmitted report.

The feedback component 640 may receive, from the second UE, feedback in response to the transmitted signal. In some examples, the feedback component 640 may transmit the received feedback to the base station.

In some examples, the feedback component 640 may generate feedback in response to the received signal. In some examples, the feedback component 640 may transmit the feedback to the second UE, or the base station, or both.

Figure 7:
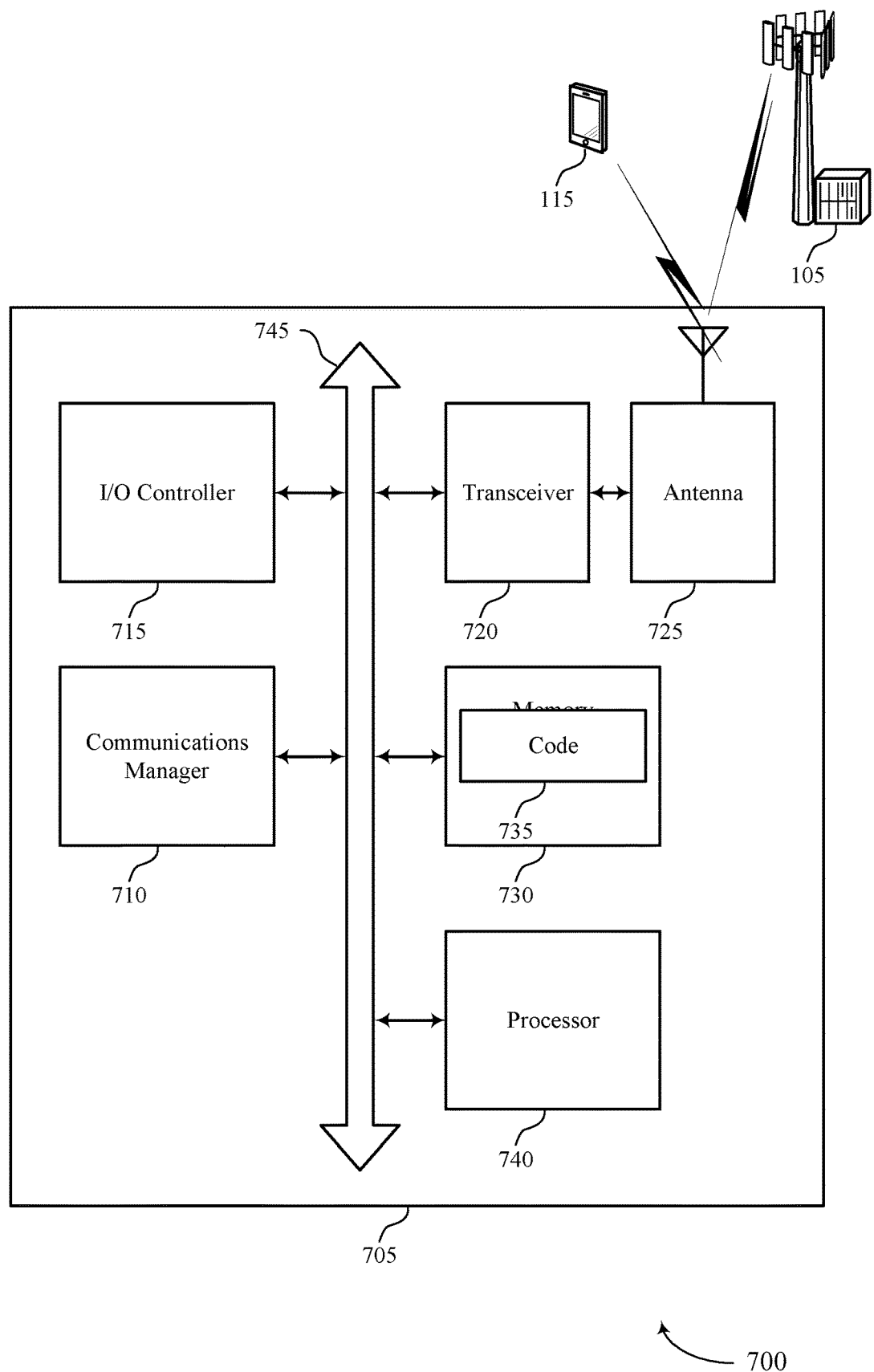
FIG. 7 shows a diagram of a system including a device that supports sidelink communication during a downlink slot in accordance with aspects of the present disclosure.

FIG. 7 shows a diagram of a system 700 including a device 705 that supports sidelink communication during a downlink slot in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may establish a sidelink connection with a second UE, the sidelink connection using a set of beams, identify a frame structure for the first UE to use to communicate with a base station, the frame structure including one or more downlink slots and one or more uplink slots, receive, from the base station, an indication of a set of resources for the sidelink connection with the second UE, the set of resources including resources in at least one downlink slot of the one or more downlink slots, and communicate with the second UE on the sidelink connection using at least one beam of the set of beams and the indicated set of resources, including the resources in the at least one downlink slot.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink communication during a downlink slot).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
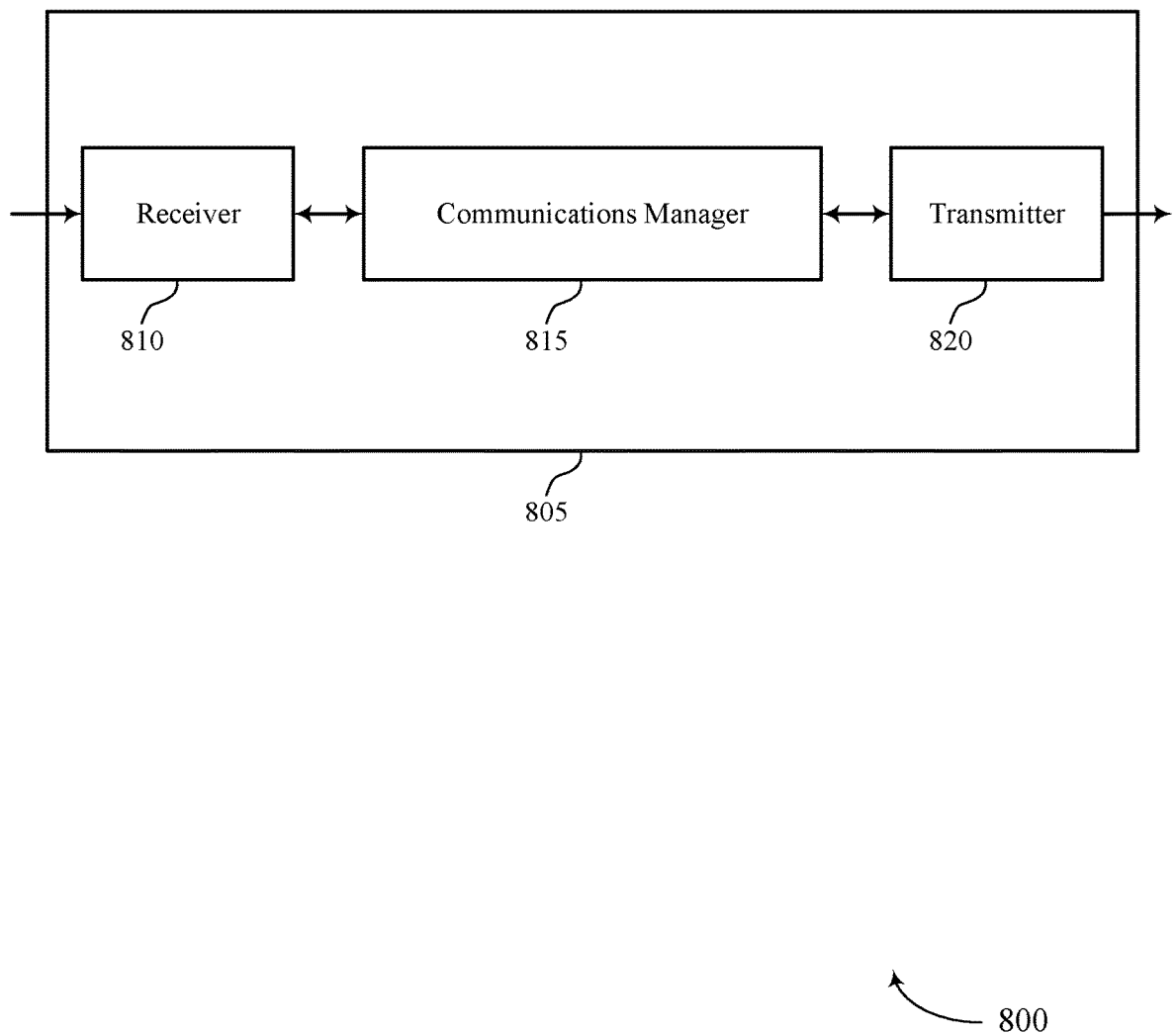
FIGS. 8 and 9 show block diagrams of devices that support sidelink communication during a downlink slot in accordance with aspects of the present disclosure.

FIG. 8 shows a block diagram 800 of a device 805 that supports sidelink communication during a downlink slot in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sidelink communication during a downlink slot, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a frame structure for the base station to use to communicate with a first UE, the frame structure including one or more downlink slots and one or more uplink slots, transmit, to the first UE, an indication of a set of resources for a sidelink connection between the first UE and a second UE, the set of resources including resources in at least one downlink slot of the one or more downlink slots, and the sidelink connection using a set of beams at the first UE, and receive feedback associated with communications between the first UE and the second UE over the sidelink connection during the at least one downlink slot. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
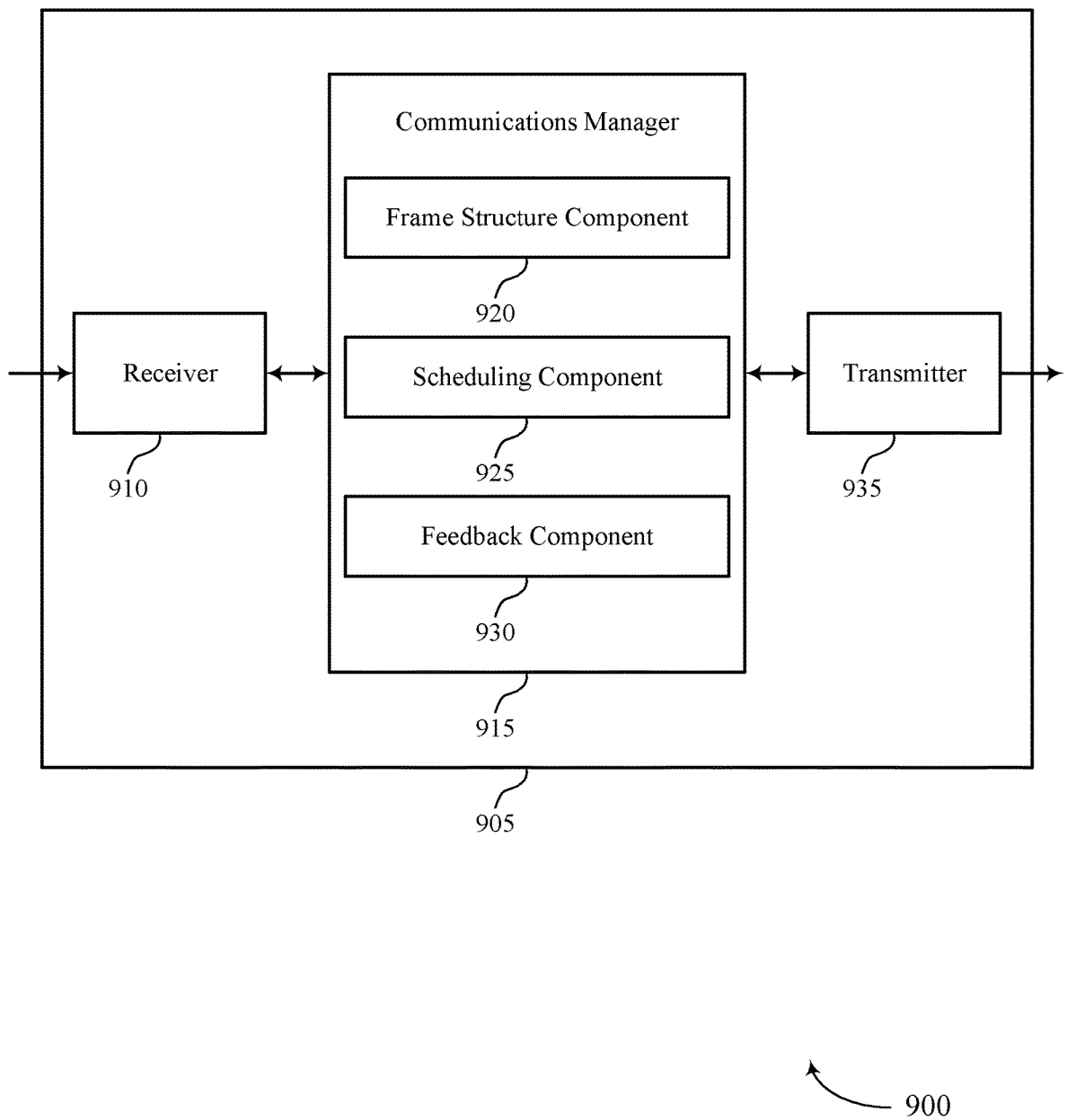

FIG. 9 shows a block diagram 900 of a device 905 that supports sidelink communication during a downlink slot in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to sidelink communication during a downlink slot, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a frame structure component 920, a scheduling component 925, and a feedback component 930. The communications manager 915 may be an example of aspects of the communications manager 1110 described herein.

The frame structure component 920 may identify a frame structure for the base station to use to communicate with a first UE, the frame structure including one or more downlink slots and one or more uplink slots.

The scheduling component 925 may transmit, to the first UE, an indication of a set of resources for a sidelink connection between the first UE and a second UE, the set of resources including resources in at least one downlink slot of the one or more downlink slots, and the sidelink connection using a set of beams at the first UE.

The feedback component 930 may receive feedback associated with communications between the first UE and the second UE over the sidelink connection during the at least one downlink slot.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
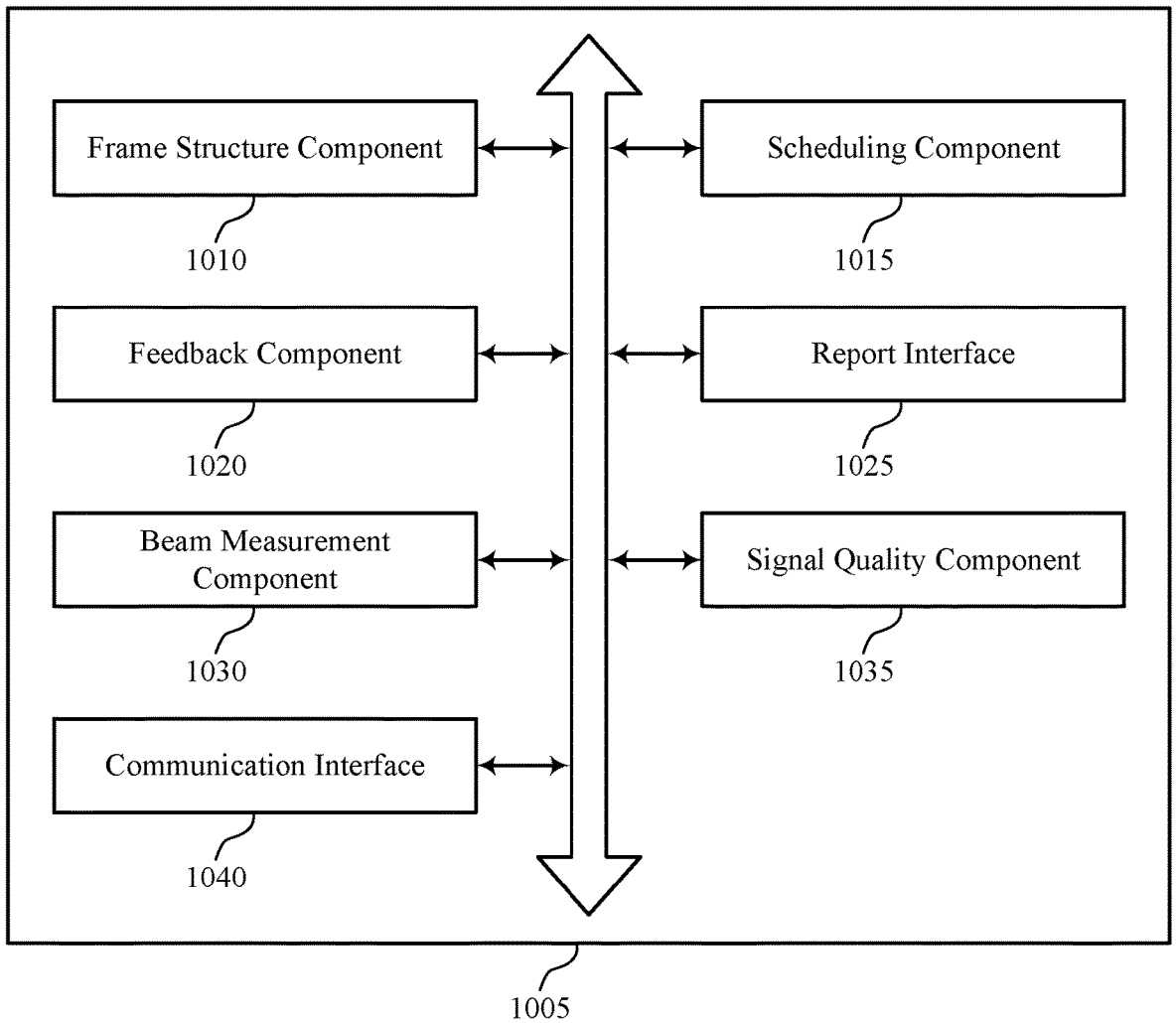
FIG. 10 shows a block diagram of a communications manager that supports sidelink communication during a downlink slot in accordance with aspects of the present disclosure.

FIG. 10 shows a block diagram 1000 of a communications manager 1005 that supports sidelink communication during a downlink slot in accordance with aspects of the present disclosure. The communications manager 1005 may be an example of aspects of a communications manager 815, a communications manager 915, or a communications manager 1110 described herein. The communications manager 1005 may include a frame structure component 1010, a scheduling component 1015, a feedback component 1020, a report interface 1025, a beam measurement component 1030, a signal quality component 1035, and a communication interface 1040. Each of these modules may communicate, directly or indirectly, with one another (e.g., via one or more buses).

The frame structure component 1010 may identify a frame structure for the base station to use to communicate with a first UE, the frame structure including one or more downlink slots and one or more uplink slots.

The scheduling component 1015 may transmit, to the first UE, an indication of a set of resources for a sidelink connection between the first UE and a second UE, the set of resources including resources in at least one downlink slot of the one or more downlink slots, and the sidelink connection using a set of beams at the first UE.

In some examples, the scheduling component 1015 may identify the set of resources for the sidelink connection, the set of beams, or both based on the report.

In some examples, the scheduling component 1015 may identify at least one beam pair of the set of beams based on the received signal quality measurements.

In some examples, the scheduling component 1015 may transmit, to the first UE, or the second UE, or both, an indication of the at least one beam pair to use for the communications over the sidelink connection during the at least one downlink slot.

In some examples, the scheduling component 1015 may identify the set of resources for the sidelink connection, the set of beams, or both based on the feedback.

In some cases, the indication of the set of resources further indicates whether the first UE is to transmit a signal to the second UE or receive a signal from the second UE using resources in the at least one downlink slot, where the communications are performed based on the indication.

The feedback component 1020 may receive feedback associated with communications between the first UE and the second UE over the sidelink connection during the at least one downlink slot.

The report interface 1025 may receive, from at least one of the first UE and the second UE, a report indicating a result of a beam measurement procedure performed by the at least one of the first UE and the second UE.

The beam measurement component 1030 may transmit, to at least one of the first UE and the second UE, an instruction to perform the beam measurement procedure.

In some cases, the beam measurement procedure is performed using resources in the one or more downlink slots.

The signal quality component 1035 may receive, from the first UE, the second UE, a third UE, or a combination thereof, signal quality measurements corresponding to the set of beams.

In some examples, the signal quality component 1035 may determine that a signal quality measurement for the at least one beam pair is above a signal quality threshold, where the at least one beam pair is identified based on the signal quality threshold.

In some examples, the signal quality component 1035 may receive, from the third UE, a signal quality measurement associated with the downlink signal, where the at least one beam pair is identified based on the signal quality measurement associated with the downlink signal.

The communication interface 1040 may transmit, to the third UE, a downlink signal using resources in the one or more downlink slots.

In some examples, the communication interface 1040 may transmit, to a third UE, a downlink signal using resources in the at least one downlink slot. In some examples, the communication interface 1040 may transmit, to the third UE, the downlink signal using a transmit beam, the third UE being configured to receive the downlink signal using a receive beam.

In some cases, the base station, the first UE, and the second UE operate in accordance with a mode 1 sidelink operation mode.

Figure 11:
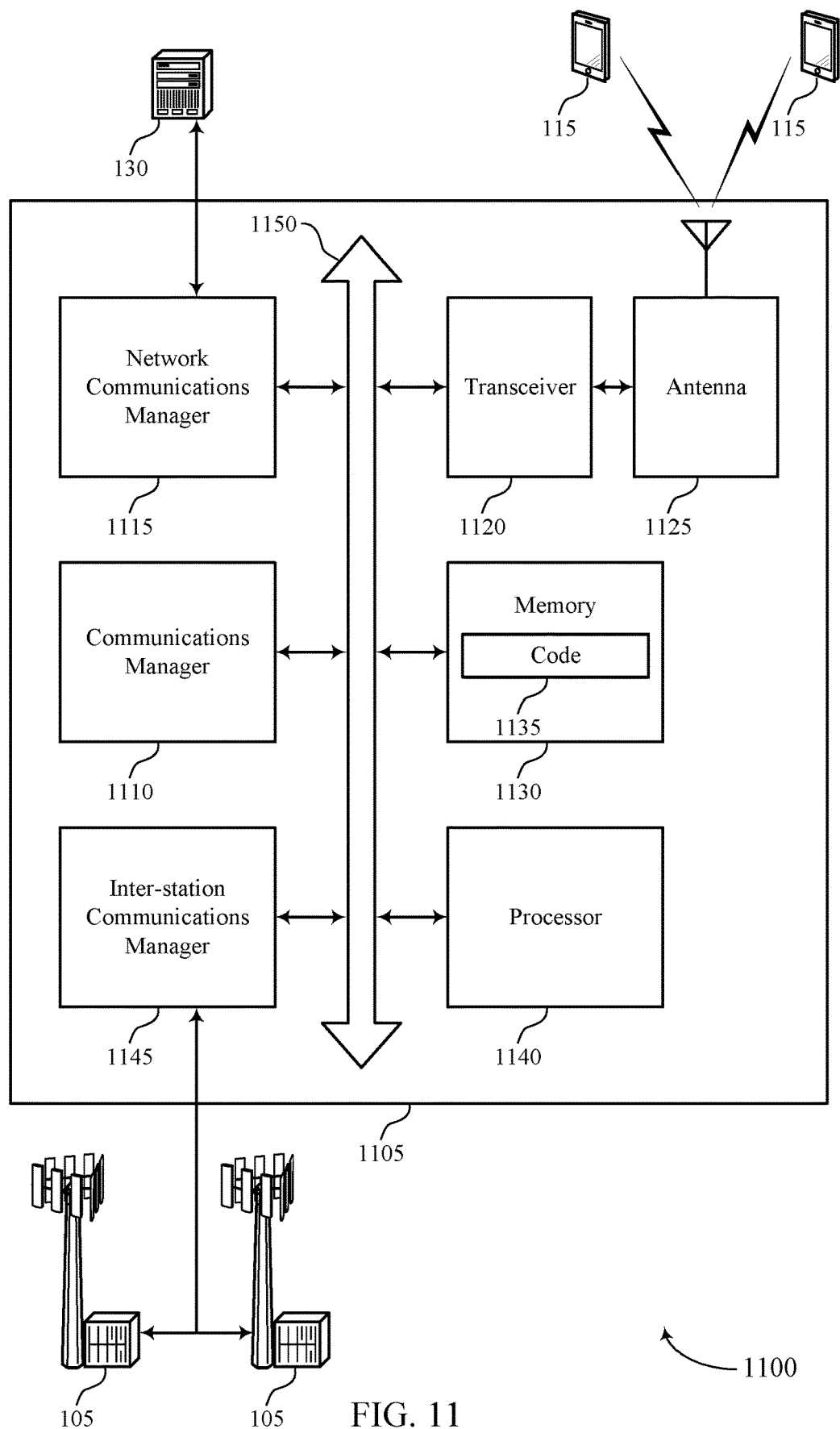
FIG. 11 shows a diagram of a system including a device that supports sidelink communication during a downlink slot in accordance with aspects of the present disclosure.

FIG. 11 shows a diagram of a system 1100 including a device 1105 that supports sidelink communication during a downlink slot in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a frame structure for the base station to use to communicate with a first UE, the frame structure including one or more downlink slots and one or more uplink slots, transmit, to the first UE, an indication of a set of resources for a sidelink connection between the first UE and a second UE, the set of resources including resources in at least one downlink slot of the one or more downlink slots, and the sidelink connection using a set of beams at the first UE, and receive feedback associated with communications between the first UE and the second UE over the sidelink connection during the at least one downlink slot.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting sidelink communication during a downlink slot).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
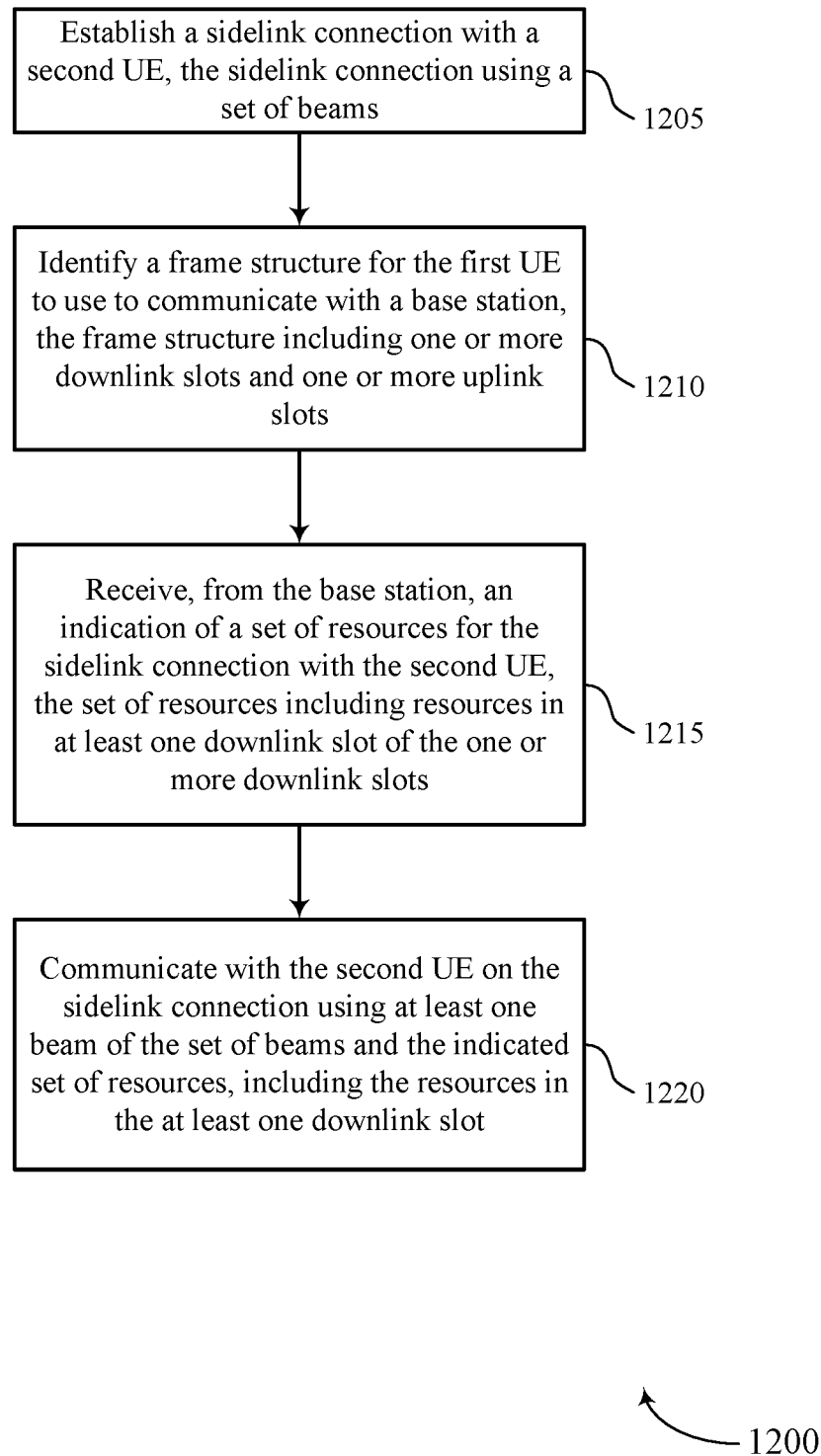
FIGS. 12 and 13 show flowcharts illustrating methods that support sidelink communication during a downlink slot in accordance with aspects of the present disclosure.

FIG. 12 shows a flowchart illustrating a method 1200 that supports sidelink communication during a downlink slot in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may establish a sidelink connection with a second UE, the sidelink connection using a set of beams. The operations of 1205 may be performed according to the methods described herein. In some examples, aspects of the operations of 1205 may be performed by a sidelink connection component as described with reference to FIGS. 4 through 7.

At 1210, the UE may identify a frame structure for the first UE to use to communicate with a base station, the frame structure including one or more downlink slots and one or more uplink slots. The operations of 1210 may be performed according to the methods described herein. In some examples, aspects of the operations of 1210 may be performed by a frame structure component as described with reference to FIGS. 4 through 7.

At 1215, the UE may receive, from the base station, an indication of a set of resources for the sidelink connection with the second UE, the set of resources including resources in at least one downlink slot of the one or more downlink slots. The operations of 1215 may be performed according to the methods described herein. In some examples, aspects of the operations of 1215 may be performed by a scheduling component as described with reference to FIGS. 4 through 7.

At 1220, the UE may communicate with the second UE on the sidelink connection using at least one beam of the set of beams and the indicated set of resources, including the resources in the at least one downlink slot. The operations of 1220 may be performed according to the methods described herein. In some examples, aspects of the operations of 1220 may be performed by a communication interface as described with reference to FIGS. 4 through 7.

Figure 13:
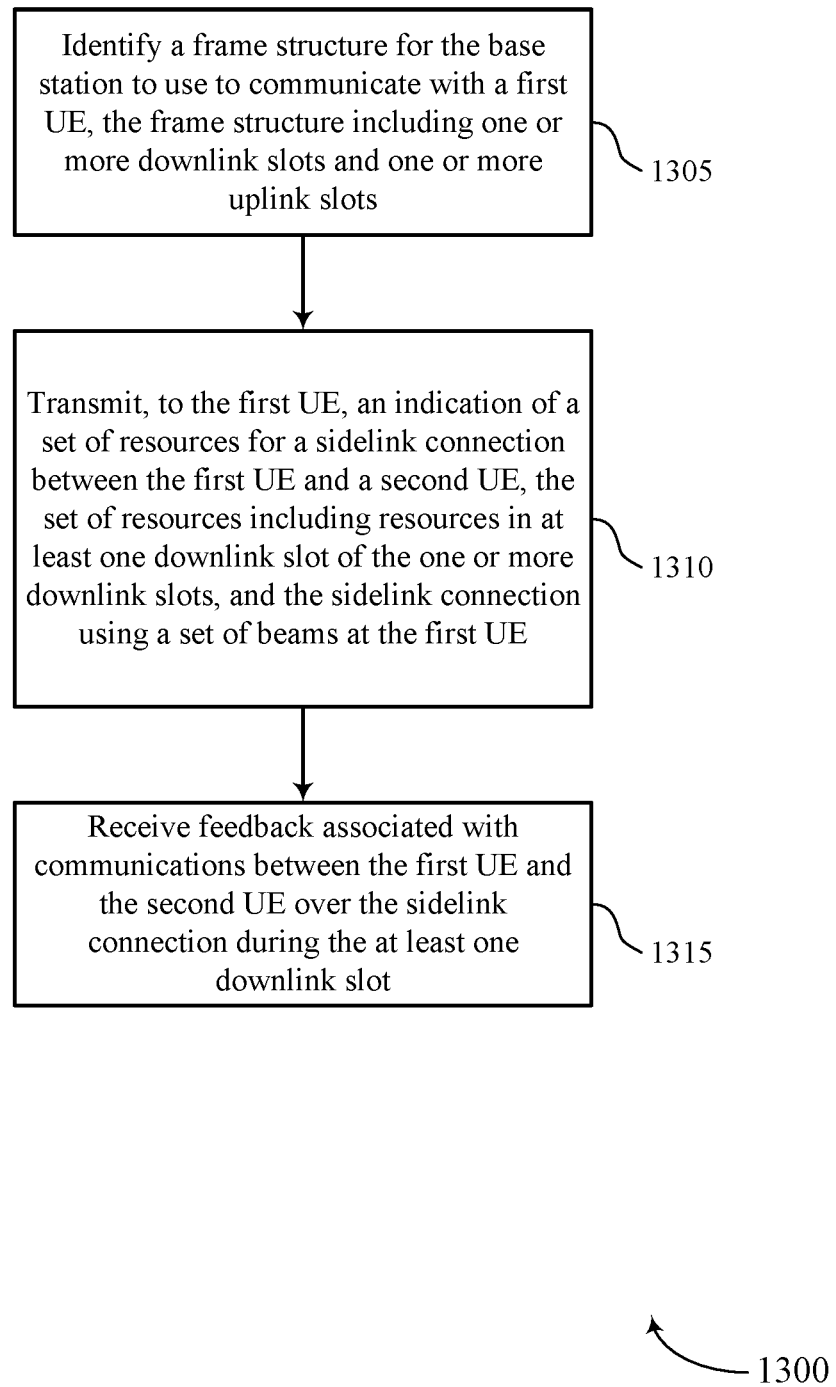

FIG. 13 shows a flowchart illustrating a method 1300 that supports sidelink communication during a downlink slot in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1305, the base station may identify a frame structure for the base station to use to communicate with a first UE, the frame structure including one or more downlink slots and one or more uplink slots. The operations of 1305 may be performed according to the methods described herein. In some examples, aspects of the operations of 1305 may be performed by a frame structure component as described with reference to FIGS. 8 through 11.

At 1310, the base station may transmit, to the first UE, an indication of a set of resources for a sidelink connection between the first UE and a second UE, the set of resources including resources in at least one downlink slot of the one or more downlink slots, and the sidelink connection using a set of beams at the first UE. The operations of 1310 may be performed according to the methods described herein. In some examples, aspects of the operations of 1310 may be performed by a scheduling component as described with reference to FIGS. 8 through 11.

At 1315, the base station may receive feedback associated with communications between the first UE and the second UE over the sidelink connection during the at least one downlink slot. The operations of 1315 may be performed according to the methods described herein. In some examples, aspects of the operations of 1315 may be performed by a feedback component as described with reference to FIGS. 8 through 11.

The following provides an overview of aspects of the present disclosure:

Aspect 1: A method for wireless communication at first UE, comprising: establishing a sidelink connection with a second UE, the sidelink connection using a set of beams; identifying a frame structure for the first UE to use to communicate with a base station, the frame structure including one or more downlink slots and one or more uplink slots; receiving, from the base station, an indication of a set of resources for the sidelink connection with the second UE, the set of resources including resources in at least one downlink slot of the one or more downlink slots; and communicating with the second UE on the sidelink connection using at least one beam of the set of beams and the indicated set of resources, including the resources in the at least one downlink slot.

Aspect 2: The method of aspect 1, further comprising: performing a beam measurement procedure on a plurality of beams to identify the set of beams; and transmitting, to the base station, a report indicating a result of the beam measurement procedure, the indication of the set of resources based at least in part on the transmitted report.

Aspect 3: The method of aspect 2, wherein performing the beam measurement procedure comprises: measuring, using each receive beam of a set of receive beams of the plurality of beams, one or more first reference signals received using the receive beam; and transmitting one or more second reference signals using a set of transmit beams.

Aspect 4: The method of aspect 3, wherein the one or more first reference signals are transmitted using resources in the one or more downlink slots, or the one or more second reference signals are received using resources in the one or more downlink slots, or both.

Aspect 5: The method of any of aspects 1 through 4, wherein communicating with the second UE comprises: transmitting, to the second UE and using at least one transmit beam of the sidelink connection, a signal on resources of the indicated set of resources for the sidelink connection in the at least one downlink slot.

Aspect 6: The method of aspect 5, further comprising: receiving, from the second UE, feedback in response to the transmitted signal; and transmitting the received feedback to the base station.

Aspect 7: The method of any of aspects 1 through 6, wherein communicating with the second UE comprises: receiving, from the second UE and using at least one receive beam of the sidelink connection, a signal on resources of the indicated set of resource for the sidelink connection in the at least one downlink slot.

Aspect 8: The method of aspect 7, further comprising: generating feedback in response to the received signal; and transmitting the feedback to the second UE, or the base station, or both.

Aspect 9: The method of any of aspects 1 through 8, further comprising: receiving, from the base station, an identification of the set of beams for the sidelink connection.

Aspect 10: The method of any of aspects 1 through 9, wherein the base station, the first UE, and the second UE operate in accordance with a mode 1 sidelink operation mode.

Aspect 11: The method of any of aspects 1 through 10, wherein the indication of the set of resources further indicates whether the first UE is to transmit a signal to the second UE or receive a signal from the second UE using resources in the at least one downlink slot.

Aspect 12: A method of wireless communication at a base station, comprising: identifying a frame structure for the base station to use to communicate with a first UE, the frame structure including one or more downlink slots and one or more uplink slots; transmitting, to the first UE, an indication of a set of resources for a sidelink connection between the first UE and a second UE, the set of resources including resources in at least one downlink slot of the one or more downlink slots, and the sidelink connection using a set of beams at the first UE; and receiving feedback associated with communications between the first UE and the second UE over the sidelink connection during the at least one downlink slot.

Aspect 13: The method of aspect 12, further comprising: receiving, from at least one of the first UE and the second UE, a report indicating a result of a beam measurement procedure performed by the at least one of the first UE and the second UE; and identifying the set of resources for the sidelink connection, the set of beams, or both based at least in part on the report.

Aspect 14: The method of aspect 13, further comprising: transmitting, to at least one of the first UE and the second UE, an instruction to perform the beam measurement procedure.

Aspect 15: The method of any of aspects 13 through 14, wherein the beam measurement procedure is performed using resources in the one or more downlink slots.

Aspect 16: The method of any of aspects 12 through 15, further comprising: receiving, from the first UE, the second UE, a third UE, or a combination thereof, signal quality measurements corresponding to the set of beams; and identifying at least one beam pair of the set of beams based at least in part on the received signal quality measurements.

Aspect 17: The method of aspect 16, further comprising: transmitting, to the first UE, or the second UE, or both, an indication of the at least one beam pair to use for the communications over the sidelink connection during the at least one downlink slot.

Aspect 18: The method of any of aspects 16 through 17, further comprising: determining that a signal quality measurement for the at least one beam pair is above a signal quality threshold, wherein the at least one beam pair is identified based at least in part on the signal quality threshold.

Aspect 19: The method of any of aspects 16 through 18, further comprising: transmitting, to the third UE, a downlink signal using resources in the one or more downlink slots; and receiving, from the third UE, a signal quality measurement associated with the downlink signal, wherein the at least one beam pair is identified based at least in part on the signal quality measurement associated with the downlink signal.

Aspect 20: The method of any of aspects 12 through 19, further comprising: identifying the set of resources for the sidelink connection, the set of beams, or both based at least in part on the feedback.

Aspect 21: The method of any of aspects 12 through 20, further comprising: transmitting, to a third UE, a downlink signal using resources in the at least one downlink slot.

Aspect 22: The method of aspect 21, wherein transmitting the downlink signal comprises: transmitting, to the third UE, the downlink signal using a transmit beam, the third UE configured to receive the downlink signal using a receive beam.

Aspect 23: The method of any of aspects 12 through 22, wherein the base station, the first UE, and the second UE operate in accordance with a mode 1 sidelink operation mode.

Aspect 24: The method of any of aspects 12 through 23, wherein the indication of the set of resources further indicates whether the first UE is to transmit a signal to the second UE or receive a signal from the second UE using resources in the at least one downlink slot, the communications are performed based at least in part on the indication.

Aspect 25: An apparatus for wireless communication at first UE, comprising a processor; memory coupled with the processor; and instructions stored in the memory and executable by the processor to cause the apparatus to perform a method of any of aspects 1 through 11.

Aspect 26: An apparatus for wireless communication at first UE, comprising at least one means for performing a method of any of aspects 1 through 11.

Aspect 27: A non-transitory computer-readable medium storing code for wireless communication at first UE, the code comprising instructions executable by a processor to perform a method of any of aspects 1 through 11.

Aspect 28: An apparatus comprising a processor; memory coupled with the processor; and instructions stored in the memory and executable by the processor to cause the apparatus to perform a method of any of aspects 12 through 24.

Aspect 29: An apparatus comprising at least one means for performing a method of any of aspects 12 through 24.

Aspect 30: A non-transitory computer-readable medium storing code the code comprising instructions executable by a processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at first user equipment (UE), comprising:
    establishing a sidelink connection with a second UE, the sidelink connection using a set of beams;
    identifying a frame structure for the first UE to use to communicate with a network device, the frame structure including one or more downlink slots and one or more uplink slots;
    receiving, from the network device, an indication of a set of resources for the sidelink connection with the second UE, the set of resources including resources in at least one downlink slot of the one or more downlink slots; and
    communicating with the second UE on the sidelink connection using at least one beam of the set of beams and the indicated set of resources, including the resources in the at least one downlink slot.

2. The method of claim 1, further comprising:
    performing a beam measurement procedure on a plurality of beams to identify the set of beams; and
    transmitting, to the network device, a report indicating a result of the beam measurement procedure, the indication of the set of resources based at least in part on the transmitted report.

3. The method of claim 2, wherein performing the beam measurement procedure comprises:
    measuring, using each receive beam of a set of receive beams of the plurality of beams, one or more first reference signals received using the receive beam; and
    transmitting one or more second reference signals using a set of transmit beams.

4. The method of claim 3, wherein the one or more first reference signals are received using a first resource of the identified frame structure in the one or more downlink slots, or the one or more second reference signals are transmitted using a second resource of the identified frame structure in the one or more downlink slots, or both.

5. The method of claim 1, wherein communicating with the second UE comprises:
    transmitting, to the second UE and using at least one transmit beam of the sidelink connection, a signal on resources of the indicated set of resources for the sidelink connection in the at least one downlink slot.

6. The method of claim 5, further comprising:
    receiving, from the second UE, feedback in response to the transmitted signal; and
    transmitting the received feedback to the network device.

7. The method of claim 1, wherein communicating with the second UE comprises:
    receiving, from the second UE and using at least one receive beam of the sidelink connection, a signal on resources of the indicated set of resource for the sidelink connection in the at least one downlink slot.

8. The method of claim 7, further comprising:
    generating feedback in response to the received signal; and
    transmitting the feedback to the second UE, or network device, or both.

9. The method of claim 1, further comprising:
    receiving, from the network device, an identification of the set of beams for the sidelink connection.

10. The method of claim 1, wherein the network device, the first UE, and the second UE operate in accordance with a mode 1 sidelink operation mode.

11. The method of claim 1, wherein the indication of the set of resources further indicates whether the first UE is to transmit a signal to the second UE or receive a signal from the second UE using resources in the at least one downlink slot.

12. A method for wireless communication at a network device, comprising:
identifying a frame structure for the network device to use to communicate with a first user equipment (UE), the frame structure including one or more downlink slots and one or more uplink slots;
transmitting, to the first UE, an indication of a set of resources for a sidelink connection between the first UE and a second UE, the set of resources including resources in at least one downlink slot of the one or more downlink slots, and the sidelink connection using a set of beams at the first UE; and
receiving feedback associated with communications between the first UE and the second UE over the sidelink connection during the at least one downlink slot.

13. The method of claim 12, further comprising:
receiving, from at least one of the first UE and the second UE, a report indicating a result of a beam measurement procedure performed by the at least one of the first UE and the second UE; and
identifying the set of resources for the sidelink connection, the set of beams, or both based at least in part on the report.

14. The method of claim 13, further comprising:
transmitting, to at least one of the first UE and the second UE, an instruction to perform the beam measurement procedure.

15. The method of claim 13, wherein the beam measurement procedure is performed using resources in the one or more downlink slots.

16. The method of claim 12, further comprising:
receiving, from the first UE, the second UE, a third UE, or a combination thereof, signal quality measurements corresponding to the set of beams; and
identifying at least one beam pair of the set of beams based at least in part on the received signal quality measurements.

17. The method of claim 16, further comprising:
transmitting, to the first UE, or the second UE, or both, an indication of the at least one beam pair to use for the communications over the sidelink connection during the at least one downlink slot.

18. The method of claim 16, further comprising:
determining that a signal quality measurement for the at least one beam pair is above a signal quality threshold, wherein the at least one beam pair is identified based at least in part on the signal quality threshold.

19. The method of claim 16, further comprising:
transmitting, to the third UE, a downlink signal using resources in the one or more downlink slots; and
receiving, from the third UE, a signal quality measurement associated with the downlink signal, wherein the at least one beam pair is identified based at least in part on the signal quality measurement associated with the downlink signal.

20. The method of claim 12, further comprising:
identifying the set of resources for the sidelink connection, the set of beams, or both based at least in part on the feedback.

21. The method of claim 12, further comprising:
transmitting, to a third UE, a downlink signal using resources in the at least one downlink slot.

22. The method of claim 21, wherein transmitting the downlink signal comprises:
transmitting, to the third UE, the downlink signal using a transmit beam, the third UE configured to receive the downlink signal using a receive beam.

23. The method of claim 12, wherein the network device, the first UE, and the second UE operate in accordance with a mode 1 sidelink operation mode.

24. The method of claim 12, wherein the indication of the set of resources further indicates whether the first UE is to transmit a signal to the second UE or receive a signal from the second UE using resources in the at least one downlink slot, wherein the communications are performed based at least in part on the indication.

25. A first user equipment (UE) for wireless communications, comprising:
a processor,
memory coupled with the processor; and
instructions stored in the memory and executable by the processor to cause the first UE to:
establish a sidelink connection with a second UE, the sidelink connection using a set of beams;
identify a frame structure for the first UE to use to communicate with a network device, the frame structure including one or more downlink slots and one or more uplink slots;
receive, from the network device, an indication of a set of resources for the sidelink connection with the second UE, the set of resources including resources in at least one downlink slot of the one or more downlink slots; and
communicate with the second UE on the sidelink connection using at least one beam of the set of beams and the indicated set of resources, including the resources in the at least one downlink slot.

26. The first UE of claim 25, wherein the instructions are further executable by the processor to cause the first UE to:
perform a beam measurement procedure on a plurality of beams to identify the set of beams; and
transmit, to the network device, a report indicating a result of the beam measurement procedure, the indication of the set of resources based at least in part on the transmitted report.

27. The first UE of claim 25, wherein the instructions to communicate with the second UE are executable by the processor to cause the first UE to:
transmit, to the second UE and using at least one transmit beam of the sidelink connection, a signal on resources of the indicated set of resources for the sidelink connection in the at least one downlink slot.

28. The first UE of claim 25, wherein the instructions to communicate with the second UE are executable by the processor to cause the first UE to:
receive, from the second UE and using at least one receive beam of the sidelink connection, a signal on resources of the indicated set of resource for the sidelink connection in the at least one downlink slot.

29. The first UE of claim 25, wherein the instructions are further executable by the processor to cause the first UE to:

receive, from the network device, an identification of the set of beams for the sidelink connection.

30. A network device for wireless communications, comprising:
- a processor;
- memory coupled with the processor; and
- instructions stored in the memory and executable by the processor to cause the network device to:
  - identify a frame structure for the network device to use to communicate with a first user equipment (UE), the frame structure including one or more downlink slots and one or more uplink slots;
  - transmit, to the first UE, an indication of a set of resources for a sidelink connection between the first UE and a second UE, the set of resources including resources in at least one downlink slot of the one or more downlink slots, and the sidelink connection using a set of beams at the first UE; and
  - receive feedback associated with communications between the first UE and the second UE over the sidelink connection during the at least one downlink slot.

\* \* \* \* \*